(12) United States Patent
Himmelfarb

(10) Patent No.: US 12,542,584 B2
(45) Date of Patent: Feb. 3, 2026

(54) SYSTEMS, METHODS, AND MEDIA FOR ESTIMATING AN AUTO-CORRELATION MATRIX FOR A TRANSCEIVER

(71) Applicant: NovAtel Inc., Calgary (CA)

(72) Inventor: Michael Himmelfarb, Calgary (CA)

(73) Assignee: NovAtel Inc., Calgary (CA)

( * ) Notice: Subject to any disclaimer, the term of this patent is extended or adjusted under 35 U.S.C. 154(b) by 0 days.

(21) Appl. No.: 18/731,252

(22) Filed: Jun. 1, 2024

(65) Prior Publication Data

US 2025/0141504 A1    May 1, 2025

Related U.S. Application Data

(60) Provisional application No. 63/546,887, filed on Nov. 1, 2023.

(51) Int. Cl.
*H04B 7/0456* (2017.01)
*H04L 5/00* (2006.01)

(52) U.S. Cl.
CPC ......... *H04B 7/0465* (2013.01); *H04B 7/0473* (2013.01); *H04L 5/0048* (2013.01)

(58) Field of Classification Search
CPC ...... H04B 7/04; H04B 7/0413; H04B 7/0456; H04B 7/046; H04B 7/0465; H04B 7/0469; H04B 7/0473; H04B 7/08; H04B 7/0837; H04B 7/084; H04B 7/0842; H04B 7/0865; H04L 5/003; H04L 5/0048; H04Q 3/00;

(Continued)

(56) References Cited

U.S. PATENT DOCUMENTS 4,298,873 A * 11/1981 Roberts ................ H01Q 3/2617
                                                              342/375
5,694,416 A * 12/1997 Johnson .................... H04B 7/08
                                                              342/368

(Continued)

FOREIGN PATENT DOCUMENTS

CN        116631077 A      8/2023
EP          2151070 B1      2/2016

OTHER PUBLICATIONS

Mcwhirter, "A Brief Review of Adaptive Null Steering Techniques" RSRE Memorandum No. 3939, Malvern, Jul. 17, 1986, 39 pages.

(Continued)

*Primary Examiner* — James M Perez
(74) *Attorney, Agent, or Firm* — Cesari and McKenna, LLP

(57) ABSTRACT

Techniques are provided for estimating an auto-correlation matrix for a transceiver that is coupled to a multi-antenna array. A different power sensor may measure the power of the signals received at a corresponding antenna of the multi-antenna array. The signals received at one antenna of each unique pair of antennas may be shifted in phase using a plurality (e.g., three) of different phase settings to generate a plurality of different shifted signals for each unique pair of antennas. Each of one or more power sensors, for each unique pair of antennas, may measure different combined powers based on the shifted signals and the RF signals received at the other antenna of the unique pair. A module may use the different combined powers with the power measured for each antenna to estimate the auto-correlation matrix.

20 Claims, 7 Drawing Sheets

(58) Field of Classification Search
CPC ......... H04Q 3/22; H04Q 3/26; H04Q 3/2605;
H04Q 3/2652; H04Q 3/2658; H04Q 3/30;
H04Q 3/34; H04Q 3/36; H04Q 3/38
See application file for complete search history.

(56) References Cited

U.S. PATENT DOCUMENTS

| | | | | |
|---|---|---|---|---|
| D389,453 S * | 1/1998 | Mitchell | ............... | D13/100 |
| 5,861,843 A * | 1/1999 | Sorace | ............... | H01Q 3/28 |
| | | | | 342/174 |
| 6,188,352 B1 * | 2/2001 | Choi | ............... | H04B 7/0865 |
| | | | | 342/378 |
| 6,590,528 B1 * | 7/2003 | DeWulf | ............... | G01S 19/36 |
| | | | | 342/383 |
| 7,605,753 B2 * | 10/2009 | Landmark | ............... | G01S 19/21 |
| | | | | 342/357.59 |
| 7,848,387 B2 * | 12/2010 | Jonsson | ............... | H04B 7/0634 |
| | | | | 375/150 |
| 8,045,926 B2 * | 10/2011 | Martikkala | ............... | H04B 17/327 |
| | | | | 455/63.4 |
| 8,660,060 B2 * | 2/2014 | Sanayei | ............... | H04B 7/0417 |
| | | | | 370/321 |
| 8,755,454 B2 * | 6/2014 | Sorrells | ............... | H04B 7/10 |
| | | | | 375/295 |
| 8,811,243 B2 * | 8/2014 | Lysejko | ............... | H04L 5/0073 |
| | | | | 370/328 |
| 8,811,461 B1 * | 8/2014 | Huynh | ............... | H04B 17/14 |
| | | | | 375/224 |
| 8,908,753 B2 * | 12/2014 | Li | ............... | H04B 17/21 |
| | | | | 375/224 |
| 9,082,014 B2 * | 7/2015 | Terrazas | ............... | G06V 20/176 |
| 9,344,168 B2 * | 5/2016 | Abreu | ............... | H04B 7/086 |
| 9,378,509 B2 * | 6/2016 | Terrazas | ............... | G06Q 30/0203 |
| 9,419,692 B2 * | 8/2016 | Sorrells | ............... | H01Q 21/061 |
| 9,547,866 B2 * | 1/2017 | Terrazas | ............... | G06Q 30/0203 |
| 9,667,455 B1 * | 5/2017 | Levakov | ............... | H04L 25/03891 |
| 9,866,259 B1 * | 1/2018 | Margomenos | ............... | H04B 1/40 |
| 9,929,757 B2 * | 3/2018 | Belostotski | ............... | H03D 7/1441 |
| 10,009,088 B2 * | 6/2018 | Rahman | ............... | H04B 7/0469 |
| 10,236,574 B2 * | 3/2019 | Chen | ............... | H02J 50/23 |
| 10,243,628 B2 * | 3/2019 | Reed | ............... | H04B 7/043 |
| 10,250,303 B2 * | 4/2019 | Wu | ............... | H04B 7/0469 |
| 10,270,510 B1 * | 4/2019 | Wang | ............... | H04B 7/0617 |
| 10,313,034 B2 * | 6/2019 | Rodriguez-Herrera | ............... | |
| | | | | H04B 17/391 |
| 10,317,449 B2 * | 6/2019 | Himmelfarb | ............... | G01R 29/26 |
| 10,355,740 B2 * | 7/2019 | Yamaguchi | ............... | H04B 17/21 |
| 10,447,360 B2 * | 10/2019 | Li | ............... | H04B 7/04 |
| 10,469,109 B2 * | 11/2019 | Gutman | ............... | H03F 3/24 |
| 10,547,358 B2 * | 1/2020 | Forenza | ............... | H04B 7/0456 |
| 10,700,762 B2 * | 6/2020 | Girnyk | ............... | H01Q 1/246 |
| 10,833,750 B2 * | 11/2020 | Bhamidipati | ............... | H04B 7/0617 |
| 11,121,780 B2 * | 9/2021 | Baccouche | ............... | H04B 17/11 |
| 11,163,050 B2 * | 11/2021 | Bharadia | ............... | G01S 13/42 |
| 11,190,327 B2 * | 11/2021 | Lu | ............... | H04J 13/0062 |
| 11,349,533 B2 * | 5/2022 | Bhamidipati | ............... | H01Q 1/2291 |
| 11,431,422 B2 * | 8/2022 | Hong | ............... | H04L 25/0202 |
| 11,563,480 B2 * | 1/2023 | Girnyk | ............... | H01Q 1/246 |
| 11,664,958 B2 * | 5/2023 | Lu | ............... | H04L 5/001 |
| | | | | 370/329 |
| 12,041,460 B2 * | 7/2024 | Montalvo | ............... | H04W 24/08 |
| 12,057,892 B2 * | 8/2024 | Chervyakov | ............... | H04W 24/06 |
| 12,068,796 B2 * | 8/2024 | Ghozlan | ............... | H04L 5/0048 |
| 12,120,529 B1 * | 10/2024 | Montalvo | ............... | H04W 24/02 |
| 12,126,407 B2 * | 10/2024 | Zhang | ............... | H04B 7/043 |
| 12,156,037 B2 * | 11/2024 | Montalvo | ............... | H04W 28/0967 |
| 12,156,136 B2 * | 11/2024 | Ye | ............... | H04J 13/0029 |
| 12,250,559 B2 * | 3/2025 | Montalvo | ............... | H04W 28/0925 |
| 12,262,214 B2 * | 3/2025 | Montalvo | ............... | H04B 17/373 |
| 12,289,603 B2 * | 4/2025 | Montalvo | ............... | H04W 16/10 |
| 12,294,865 B2 * | 5/2025 | Montalvo | ............... | H04B 17/3913 |
| 12,309,598 B2 * | 5/2025 | Montalvo | ............... | H04W 16/10 |
| 12,323,191 B2 * | 6/2025 | Chen | ............... | H04B 17/13 |
| 12,328,591 B2 * | 6/2025 | Montalvo | ............... | H04W 16/10 |
| 12,348,975 B2 * | 7/2025 | Montalvo | ............... | H04W 24/08 |
| 2004/0085933 A1 * | 5/2004 | Wang | ............... | H01Q 1/288 |
| | | | | 370/334 |
| 2006/0227891 A1 * | 10/2006 | Niu | ............... | H04L 25/0226 |
| | | | | 375/267 |
| 2007/0140389 A1 * | 6/2007 | Lindenmeier | ............... | H04B 7/084 |
| | | | | 375/347 |
| 2007/0211816 A1 * | 9/2007 | Hwang | ............... | H04B 7/0671 |
| | | | | 375/267 |
| 2008/0174477 A1 * | 7/2008 | Landmark | ............... | G01S 19/21 |
| | | | | 342/357.59 |
| 2010/0227562 A1 * | 9/2010 | Shim | ............... | H04L 25/03993 |
| | | | | 455/63.1 |
| 2010/0246494 A1 * | 9/2010 | Sanayei | ............... | H04B 7/0469 |
| | | | | 370/328 |
| 2012/0082061 A1 * | 4/2012 | Lysejko | ............... | H04W 24/02 |
| | | | | 370/254 |
| 2012/0155512 A1 * | 6/2012 | Giannakis | ............... | H04B 7/066 |
| | | | | 375/E1.003 |
| 2013/0301915 A1 * | 11/2013 | Terrazas | ............... | G06V 20/13 |
| | | | | 382/173 |
| 2014/0270355 A1 * | 9/2014 | Terrazas | ............... | G06Q 30/0205 |
| | | | | 382/103 |
| 2015/0226856 A1 * | 8/2015 | Zarowski | ............... | G01S 19/21 |
| | | | | 342/357.59 |
| 2015/0269598 A1 * | 9/2015 | Terrazas | ............... | G06V 20/176 |
| | | | | 705/7.34 |
| 2015/0280801 A1 * | 10/2015 | Xin | ............... | H04B 7/0481 |
| | | | | 370/329 |
| 2016/0080052 A1 * | 3/2016 | Li | ............... | H04B 7/0632 |
| | | | | 375/267 |
| 2017/0019154 A1 * | 1/2017 | Reed | ............... | H04B 7/0413 |
| 2017/0310348 A1 * | 10/2017 | Belostotski | ............... | H04B 1/10 |
| 2017/0331531 A1 * | 11/2017 | Wu | ............... | H04B 7/0469 |
| 2018/0024177 A1 * | 1/2018 | Himmelfarb | ............... | G01R 29/26 |
| | | | | 324/613 |
| 2018/0097558 A1 * | 4/2018 | Girnyk | ............... | H04B 7/10 |
| 2019/0082440 A1 * | 3/2019 | Han | ............... | H04B 7/0639 |
| 2019/0115989 A1 * | 4/2019 | Rodriguez-Herrera | ............... | |
| | | | | H04B 17/11 |
| 2019/0173538 A1 * | 6/2019 | Wu | ............... | H04B 7/0626 |
| 2019/0214724 A1 * | 7/2019 | Schrattenecker | ............... | G01S 7/4017 |
| 2020/0106493 A1 * | 4/2020 | Bhamidipati | ............... | H01Q 1/2291 |
| 2020/0106506 A1 * | 4/2020 | Bhamidipati | ............... | H04B 7/0456 |
| 2020/0280384 A1 * | 9/2020 | Kilambi | ............... | H04J 13/18 |
| 2020/0336270 A1 * | 10/2020 | Lu | ............... | H04L 5/0051 |
| 2021/0013956 A1 * | 1/2021 | Girnyk | ............... | H04W 52/42 |
| 2021/0058140 A1 * | 2/2021 | Schwab | ............... | H04W 16/28 |
| 2021/0234620 A1 * | 7/2021 | Baccouche | ............... | H04B 17/0085 |
| 2022/0057502 A1 * | 2/2022 | Oishi | ............... | G01S 13/765 |
| 2022/0085962 A1 * | 3/2022 | Lu | ............... | H04L 5/0048 |
| 2022/0123847 A1 * | 4/2022 | Ghozlan | ............... | H04B 17/318 |
| 2022/0131727 A1 * | 4/2022 | Khoryaev | ............... | H04L 27/261 |
| 2022/0140967 A1 * | 5/2022 | Khoryaev | ............... | H04W 56/002 |
| | | | | 375/220 |
| 2022/0167270 A1 * | 5/2022 | Ye | ............... | H04W 68/02 |
| 2022/0209836 A1 * | 6/2022 | Kovacic | ............... | H04B 1/04 |
| 2023/0208535 A1 * | 6/2023 | Raghavan | ............... | H04B 17/12 |
| 2024/0163679 A1 * | 5/2024 | Montalvo | ............... | H04W 16/14 |
| 2024/0163680 A1 * | 5/2024 | Montalvo | ............... | H04W 24/08 |
| 2024/0244453 A1 * | 7/2024 | Montalvo | ............... | H04W 24/04 |
| 2024/0298184 A1 * | 9/2024 | Montalvo | ............... | H04W 16/10 |
| 2024/0357365 A1 * | 10/2024 | Montalvo | ............... | H04W 16/10 |
| 2024/0373235 A1 * | 11/2024 | Montalvo | ............... | H04W 72/0453 |
| 2024/0388923 A1 * | 11/2024 | Montalvo | ............... | H04W 16/10 |
| 2024/0397332 A1 * | 11/2024 | Montalvo | ............... | H04W 16/14 |
| 2024/0414553 A1 * | 12/2024 | Montalvo | ............... | H04W 72/0453 |
| 2024/0430688 A1 * | 12/2024 | Montalvo | ............... | H04W 16/10 |
| 2024/0430689 A1 * | 12/2024 | Montalvo | ............... | H04B 17/354 |
| 2025/0055523 A1 * | 2/2025 | Zhao | ............... | H04B 7/0691 |
| 2025/0063373 A1 * | 2/2025 | Montalvo | ............... | H04W 24/08 |
| 2025/0141504 A1 * | 5/2025 | Himmelfarb | ............... | H04L 5/0048 |
| 2025/0141505 A1 * | 5/2025 | Himmelfarb | ............... | H04B 7/0465 |
| 2025/0141568 A1 * | 5/2025 | Chen | ............... | H04B 17/13 |
| 2025/0159488 A1 * | 5/2025 | Montalvo | ............... | H04B 17/3913 |

(56) References Cited

U.S. PATENT DOCUMENTS

2025/0175230 A1\* 5/2025 Fan .................. H04L 25/021
2025/0175808 A1\* 5/2025 Montalvo .......... H04W 72/0453
2025/0220473 A1\* 7/2025 Jiang .................. H04L 5/0048

OTHER PUBLICATIONS

Curran et al., "Analog and Digital Nulling Techniques for Multi-Element Antennas in GNSS Receivers", European Commission, Joint Research Centre (JRC), Ispra (VA), Italy, 2015, 14 pages.

Quispe, "Implementation of Null Steering Algorithms in a Compact Analog Array", thesis, Montana State University, Apr. 2014, 61 pages.

Mcmilin, Emily, De Lorenzo, David S., Lee, Thomas, Enge, Per, Akos, Dennis, Caizzone, Stefano, Konovaltsev, Andriy, "GPS Anti-Jam: A Simple Method of Single Antenna Null-Steering for Aerial Applications," Proceedings of the ION 2015 Pacific PNT Meeting, Honolulu, Hawaii, Apr. 2015, pp. 470-483.

Kadhum, Maha. (2018). Null steering using phase shifters. ARPN Journal of Engineering and Applied Sciences. 13. 3045-3051.

Cheah, Yoo Chong, Realisation of an automatic null steering antenna array at 10.5 GHz, Doctor of Philosophy thesis, Department of Electrical and Computer Engineering, University of Wollongong, 1984. https://ro.uow.edu.au/theses/1347.

C. Fernández-Prades, J. Arribas and P. Closas, "Robust GNSS Receivers by Array Signal Processing: Theory and Implementation," in Proceedings of the IEEE, vol. 104, No. 6, pp. 1207-1220, Jun. 2016.

Extended European Search Report mailed May 28, 2025 for European Patent Application. No. 24203130.0 for NovAtel, Inc., 7 pages.

\* cited by examiner

SYSTEMS, METHODS, AND MEDIA FOR ESTIMATING AN AUTO-CORRELATION MATRIX FOR A TRANSCEIVER

CROSS-REFERENCE TO RELATED APPLICATIONS

The present application claims the benefit of U.S. Provisional Patent Application Ser. No. 63/546,887, which was filed on Nov. 1, 2023, for "LOW SWAP ANTI-JAM", which is hereby incorporated by reference.

The present application is related to the following commonly assigned U.S. Patent Application Ser. No. 18/731,254, titled SYSTEMS, METHODS, AND MEDIA FOR IMPLEMENTING A POWER SENSOR CALIBRATION PROCESS AND ESTIMATING AN AUTO-CORRELATION MATRIX FOR A TRANSCEIVER.

BACKGROUND

Technical Field

The invention relates generally to transceivers, and in particular, to estimating an auto-correlation matrix for a transceiver.

Background Information

An auto-correlation matrix is used for many applications associated with phased-array antenna systems. Such applications may include, but are not limited to, beamformer steering, interference mitigation (e.g., one or a plurality of jammers), multi-path mitigation, identifying locations of signal sources, Multiple-Signal-Classification (MUSIC), Estimation of Signal Parameters via Rotational Invariance Techniques (ESPRIT), Time-difference of arrival (TDOA), etc. Therefore, accurately and efficiently estimating the autocorrelation matrix is important as it affects the system's ability to effectively implement the above-described applications.

Phase and amplitude offsets between antennas are imprinted on the carrier wave of signals incident onto a phased array. Therefore, and to measure the offsets and estimate the auto-correlation matrix, conventional systems and techniques typically operate in the voltage domain after in-phase/quadrature (IQ) demodulation. For example, conventional systems and techniques require the use of high-speed analog-to-digital converters (e.g., 100 mega-samples per second) to digitize, in near real-time, the incoming analog signals (e.g., navigation signals) into digital samples in the voltage domain. Conventional systems and techniques can then use the IQ digital samples to calculate the auto-correlation matrix using statistical methods.

The use of the required high-speed analog to digital converters and then calculating auto-correlation values is expensive in terms of processing hardware, power, and cost. Therefore, what is needed is an efficient and less expensive (e.g., in terms of processing hardware, power, and cost) technique for estimating the autocorrelation matrix.

SUMMARY

Techniques are provided for estimating an auto-correlation matrix for a transceiver according to the one or more embodiments as described herein. Specifically, the transceiver may be coupled to a multi-antenna array that includes a plurality of antennas. Each antenna may receive signals (RF signals). The transceiver may implement one or more functions based on the received signals, wherein the functions require the use of an auto-correlation matrix. As will be described in further detail below, the one or more embodiments as described herein may utilize power measurements obtained in the RF domain to estimate the correlation matrix more efficiently and less expensively than conventional systems and techniques.

To that end, the transceiver may include a different power sensor for each antenna of the multi-antenna array. Each power sensor may be referred to as an antenna assigned power sensor. Each power sensor, i.e., antenna assigned power sensor, may measure the power of the signals received at its respective antenna. The transceiver may also include one or more power sensors for each unique pair of antennas. The one or more power sensors for each unique pair of antennas may be referred to as one or more combined power sensors. The signals received at one antenna of each unique pair of antennas may be shifted based on a plurality of different phase offsets (i.e., settings) to generate a plurality of different shifted signals. In an embodiment, the plurality of different phase offsets are $0$, $\pi/2$, and $\pi$ (radians) which are used to generate three shifted signals for one antenna of each unique pair of antennas.

The one or more power sensors, i.e., one or more combined power sensors, for each unique pair of antennas may measure a combined power of each of the shifted signals and the signal received at the other antenna of the unique pair of antennas. As such, a plurality (e.g., three) of combined power measurements are made for each unique pair of antennas of the multi-antenna array.

In an embodiment, the transceiver may optionally include an amplitude corrector and/or an RF power combiner. The amplitude corrector may correct the amplitude of each shifted signal to generate a plurality (e.g., three) of corrected signals. Alternatively, the shifted signals may be corrected in amplitude in a variety of different ways to generate the plurality of corrected signals.

Each corrected signal and the signal from the other antenna of the unique pair may be combined by a corresponding RF power combiner to generate a plurality (e.g., three) of combined signals. Thereafter, the one or more power sensors, i.e., one or more combined power sensors, for each unique pair of antennas may measure the combined power of the plurality (e.g., three) of combined signals output from the RF power combiner. Therefore, and in this embodiment with an amplitude corrector and/or RF combiner, a plurality (e.g., three) of combined power measurements are also made for each unique pair of antennas of the multi-antenna array.

The transceiver may include a module (e.g., a correlation module) that is executed by a processor of the transceiver. The module may use the plurality (e.g., three) of power measurements for each unique pair of antennas to solve a system of power equations to calculate three unknowns that relate to the characteristics of the corresponding unique pair of antennas. The module may use the three unknowns for each unique pair of antennas to calculate a maximum power and a minimum power for the corresponding unique pair of antennas. Alternatively, the module may use a search technique (e.g., maximum and/or minimum search technique) to identify the maximum and minimum powers, for the corresponding unique pair of antennas, from the plurality of combined power measurements taken for the corresponding unique pair of antennas at a plurality of different phase offsets that are based on a selected offset interval.

The module may use the maximum power and the minimum power for each unique pair of antennas to estimate an auto-correlation for the corresponding unique pair of antennas.

The module may then estimate the auto-correlation matrix for the multi-antenna array using the auto-correlation estimated for each unique pair of antennas and the power measured for each antenna of the multi-antenna array. Optionally, the transceiver may implement a function using the auto-correlation matrix estimated according to the one or more embodiments as described herein.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
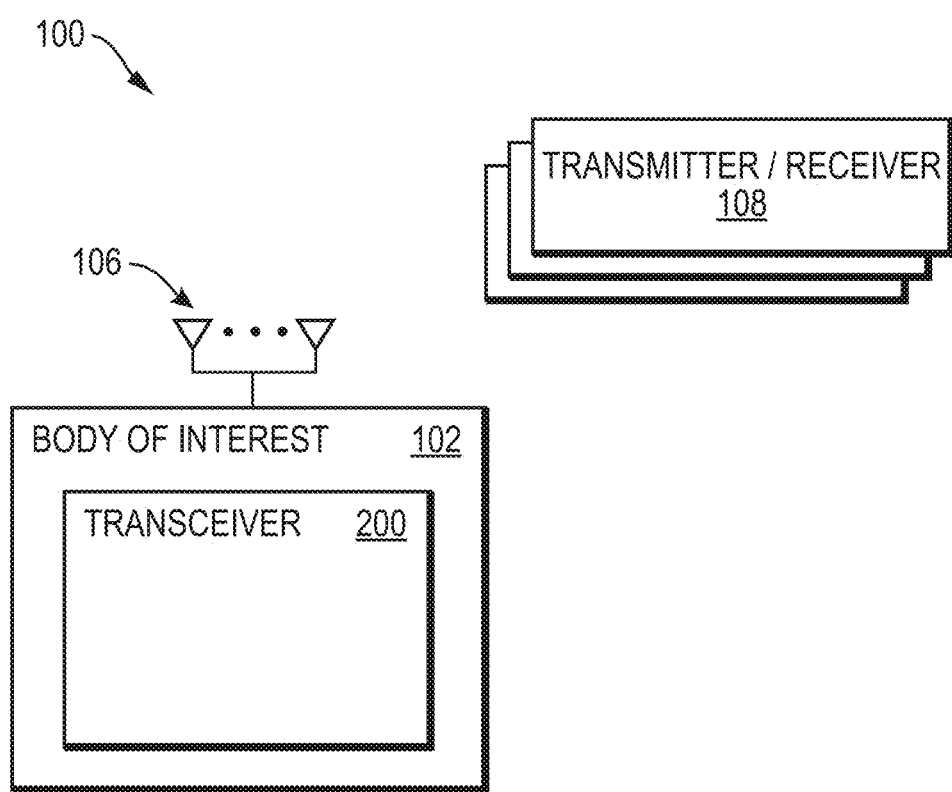
FIG. 1 is an illustration of an example system environment for estimating an auto-correlation matrix for a transceiver according to the one or more embodiments as described herein.

FIG. 1 is an illustration of an example system environment for estimating an auto-correlation matrix for a transceiver according to the one or more embodiments as described herein. System environment 100 includes transceiver 200 with a coupled multi-antenna array 106. The ellipsis between the two antennas of the multi-antenna array 106 is used to indicate that multi-antenna array 106 may include any number of a plurality of antennas. Each of the plurality of antennas of multi-antenna array 106 may be configured to transmit and/or receive one or more signals to/from one or more transmitters/receivers 108. It should be expressly understood that multi-antenna array, phase-array antenna, antenna array, antenna array system, etc. may be used interchangeably, and each is meant to indicate a system that includes at least multi-antenna array 106 with a plurality of antennas.

In an embodiment, the one or more transmitters/receivers 108 may be one or more Global Navigation Satellite System (GNSS) satellites that transmit one or more navigation signals, e.g., GNSS satellite signals (not shown). Although reference may be made to transmitters/receivers 108 being GNSS satellites transmitting GNSS satellite signals, it is expressly contemplated that the one or more embodiments as described herein may be utilized with any of a variety of different types of transmitters/receivers 108. For example, transmitters/receivers 108 may be terrestrial transmitters/receivers that transmit and/or receive any of a variety of different signals such as, but not limited to, navigation signals. As such, the description of transmitters/receivers 108 being GNSS satellites that transmit GNSS signals should be taken for illustrative purposes only.

In an embodiment, transceiver 200 may be a navigation receiver. The navigation receiver may, based on the reception of signals at multi-antenna array 106, produce raw measurements (e.g., GNSS raw measurements), such as pseudoranges, carrier phases (e.g., differenced carrier phase measurements), and Doppler velocities; position (e.g., GNSS position), velocity (e.g., GNSS velocity), attitude, and time (e.g., GNSS time), position covariance, time covariance, and velocity covariance; and, as appropriate, GNSS observables.

Transceiver 200 may implement one or more functions that require the use of an auto-correlation matrix. Such functions may include, but are not limited to, beamformer steering, interferer mitigation steering (e.g., one or a plurality of jammers), multipath mitigation, identifying locations of signal sources, Multiple-Signal-Classification (MUSIC), Estimation of Signal Parameters via Rotational Invariance Techniques (ESPRIT), Time-difference of arrival (TDOA), etc.

As will be described in further detail below in relation to FIGS. 2A-2C, 3A, 3B, and 4, a module (e.g., correlation module 214 in FIGS. 2A-2C) can estimate an auto-correlation matrix for transceiver 200 using a plurality of power measurements obtained in a radio frequency (RF) domain. Because the auto-correlation matrix can be estimated in the RF domain and directly from the signals received at the multi-antenna array 106 as will be described in further detail below, the signals do not need to be demodulated (no heterodyne converters required), digitized (no high speed ADCs required), or processed at baseband speeds (no FPGAs required) as is required by conventional systems and techniques.

As such, the one or more embodiments as described herein for estimating an auto-correlation matrix for a transceiver is more efficient and less expensive (e.g., in terms of processing hardware, power, and cost) when compared to conventional systems and techniques. As a result, the one or more embodiments as described herein provide an improvement in the existing technological field of transceiver device operation. Stated another way, the one or more embodiments as described herein can estimate the auto-correlation matrix in a manner that is more efficient and less expensive when compared to conventional systems and techniques. Therefore, the one or more embodiments as described herein provide an improvement in the existing technological field for transceiver devices that require the use of an auto-correlation matrix for implementing one or more transceiver functions (e.g., beamformer steering, interference mitigation steering, identifying locations of signal sources, MUSIC, ESPRIT, TDOA, etc.).

Figure 2A:
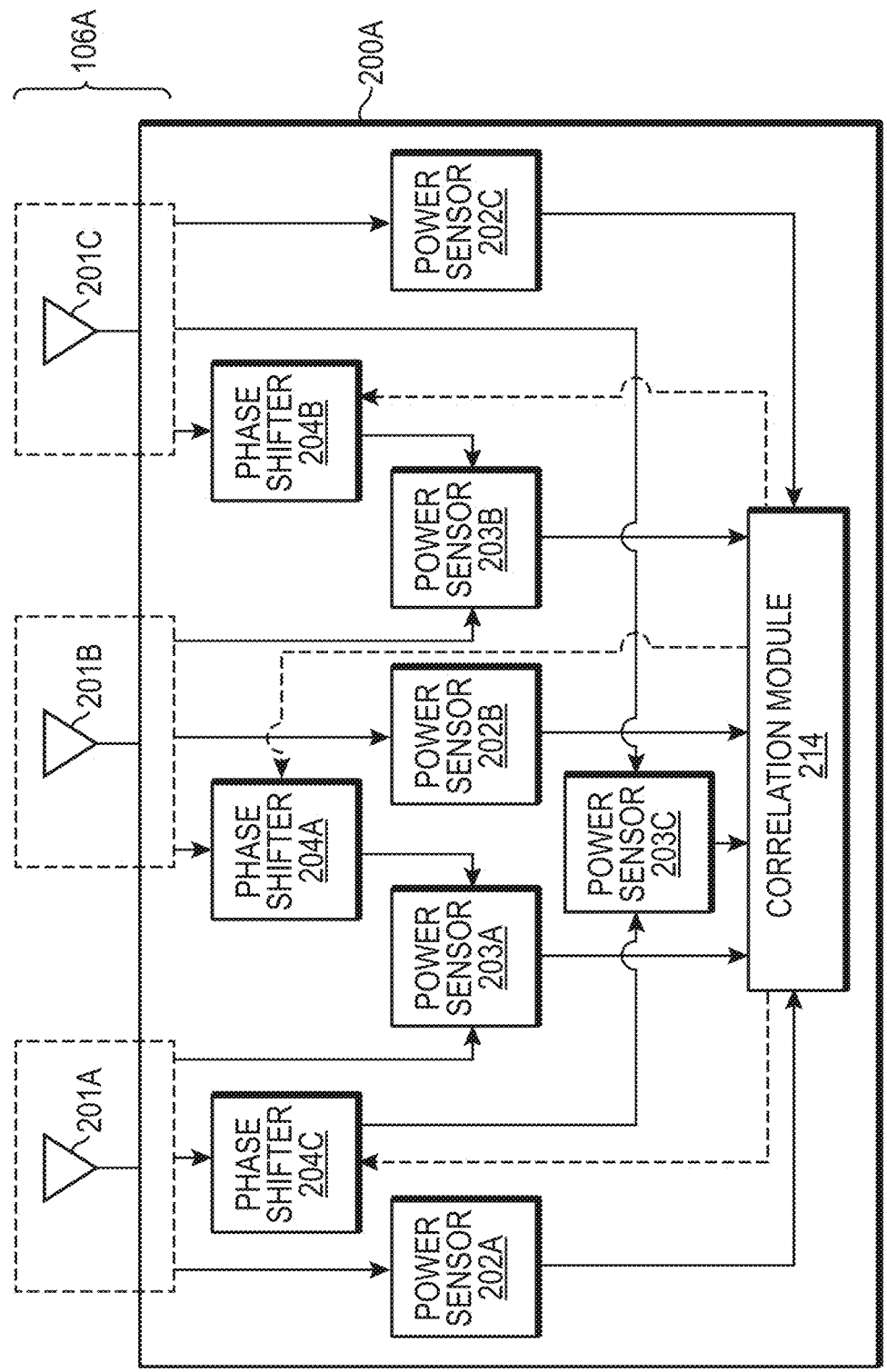
FIG. 2A is an example transceiver with a multi-antenna array, having three antennas, for estimating an auto-correlation matrix according to the one or more embodiments as described herein.

FIG. 2A is an example transceiver 200A with a multi-antenna array 106A, having three antennas, for estimating an auto-correlation matrix according to the one or more embodiments as described herein. As depicted in FIG. 2A, multi-antenna array 106A includes antennas 201A, 201B, and 201C. For clarity and ease of understanding, a dashed box is provided around each of antennas 201A, 201B, and 201C to indicate that any line from a dashed box represents a path from the corresponding antenna to a power sensor or a phase shifter in FIG. 2A. Each of the paths in FIG. 2A, which may be indicated with an arrow, may be a cable, wire, or some other type of connection.

For example, and as depicted in FIG. 2A, there may be a path from (1) an antenna to a power sensor, (2) from an antenna to a phase shifter, (3) from a phase shifter to a power sensor, and (4) from a power sensor to correlation module 214. As will be described in further detail below, each of the power sensors in FIG. 2A may measure, i.e., determine, power. Additionally, and as will be described in further detail below, each phase shifter may, based on a phase offset, shift signals that are received at an antenna in phase and in amplitude. In an embodiment, the signals received at antennas 201A, 201B, and 201C may be RF signals, i.e., signals in the RF domain. For example, antennas 201A, 201B, and 201C may receive signals from transmitters/receivers 108 of FIG. 1. In an embodiment, the signals may be navigation signals.

As depicted in FIG. 2A, transceiver 200A includes a separate and dedicated power sensor for each of antennas 201A, 201B, and 201C. Specifically, power sensor 202A may correspond to antenna 201A and may measure the power of the signals (e.g., RF signals) received at antenna 201A. Power sensor 202B may correspond to antenna 201B and may measure the power of the signals (e.g., RF signals) received at antenna 201B. Power sensor 202C may correspond to antenna 201C and may measure the power of the signals (e.g., RF signals) received at antenna 201C. The powers measured at power sensors 202A-202C may be provided to correlation module 214 as depicted in FIG. 2A. In an embodiment, each of power sensors 202A-202C may be referred to as an antenna assigned power sensor.

As depicted in FIG. 2A, transceiver 200A also includes a different power sensor and a different phase shifter for each unique pair of antennas of multi-antenna array 106A. In this example, the unique pairs of antennas include (1) antenna 201A and antenna 201B, (2) antenna 201B and antenna 201C, and (3) antenna 201A and 201C.

Therefore, and in the example of FIG. 2A, transceiver 200A includes phase shifter 204A and power sensor 203A for the unique pair of antennas 201A and 201B. Phase shifter 204A shifts the signals that are received at antenna 201B in phase and in amplitude to generate shifted signals. Power sensor 203A may then measure a combined power of a shifted signal, corresponding to the signals received at antenna 201B, and a signal received at antenna 201A as depicted in FIG. 2A.

Transceiver 200A further includes phase shifter 204B and power sensor 203B for the unique pair of antennas 201B and 201C. Phase shifter 204B shifts the signals that are received at antenna 201C in phase and in amplitude to generate shifted signals. Power sensor 203B may then measure a combined power of a shifted signal, corresponding to the signals received at antenna 201C, and a signal received at antenna 201B as depicted in FIG. 2A.

Transceiver 200A also includes phase shifter 204C and power sensor 203C for the unique pair of antennas 201A and 201C. Phase shifter 204C shifts the signals that are received at antenna 201A in phase and in amplitude to generate shifted signals. Power sensor 203C may then measure a combined power of a shifted signal, corresponding to the signals received at antenna 201A, and a signal received at antenna 201C as depicted in FIG. 2A. In an embodiment, each of power sensors 203A-203C may be referred to as a combined power sensor.

According to the one or more embodiments as described herein, and as will be described in further detail below, each of phase shifters 204A, 204B, and 204C may have a plurality of different phase settings. In an embodiment, the phase settings may be a plurality of different phase offsets at a predetermined/selected phase interval. In an alternative embodiment, the plurality of different phase settings are three phase settings of 0, $\pi/2$, and $\pi$ (radians). As a result, each of power sensors 203A, 203B, and 203C may make a plurality (e.g., three) of combined power measurements for each unique pair of antennas in the manner described above and based on the plurality (e.g., three) of different phase settings. In an embodiment, the correlation module 214 may provide a signal to each of phase shifters 204A, 204B, and 204C to modify the phase settings of the phase shifters between the plurality of different values (e.g., 0, $\pi/2$, and $\pi$ (radians)). The signals from the correlation module 214 to the phase shifters 204A, 204B, and 204C are indicated in FIG. 2A with dashed arrows.

Although the example as depicted in FIG. 2A includes a phase shifter coupled to a particular antenna of each unique pair, it is expressly contemplated that the phase shifter may be coupled to the other antenna of each unique pair. For example, although phase shifter 204A is coupled to antenna 201B for the unique pair of antennas 201A and 201B, it is expressly contemplated that the phase shifter 204A can instead be coupled to antenna 201A for the unique pair of antennas 201A and 201B. As an even further example, consider the unique pair of antennas 201A and 201C. Instead of phase shifter 204C being coupled to antenna 201A, it is expressly contemplated that the phase shifter 204B, which is used for the unique pair of antennas 201B and 201C, may also be used for the unique pair of antennas 201A and 201C. Therefore, the output of the phase shifter 204B may be provided to both power sensors 203B and 203C.

As such, the configuration of the phase shifters as depicted in FIG. 2A is for illustrative purposes only, and it is expressly contemplated that the one or more embodiments as described herein may utilize any configuration such that the signals received at one antenna, of each unique pair of antennas, is shifted in phase and in amplitude.

In an embodiment, a transceiver 200 (e.g., transceiver 200A of FIG. 2A) according to the one or more embodiments as described herein requires a number of power sensors that is equal to n+n(n−1)/2, where n is the number of antennas of the multi-antenna array 106 (e.g., multi-antenna array 106A of FIG. 2A).

For example, and as depicted in FIG. 2A, transceiver 200A includes three antennas. Therefore, transceiver 200A requires the use of six different power sensors, e.g., 3+3(3−1)/2. Specifically, transceiver 200A includes three different power sensors (e.g., 202A, 202B, and 202C), one for each of antennas 201A, 201B, and 201C. Further, transceiver 200A includes three additional power sensors (e.g., 203A, 203B, and 203C), one for each unique pair of antennas. Therefore, transceiver 200A of FIG. 2A includes a total of six power sensors according to the one or more embodiments as described herein.

As a further example, a transceiver 200 that includes a multi-antenna array 106 with two antennas would require a total of three power sensors, e.g., 2+2(2−1)/2. Specifically, a different power sensor would be required for each of the two antennas, and then a third power sensor would be required for the single unique pair of antennas. As an even further example, a transceiver 200 that includes a multi-antenna array 106 with six antennas would require a total of twenty-one power sensors, e.g., 6+6(6−1)/2. Specifically, a different power sensor would be required for each of the six antennas. Additionally, a different power sensor would also be required for the fifteen unique pairs of antennas.

The multi-antenna array 106A of FIG. 2A including three antennas is for illustrative purposes only, and it is expressly contemplated that the one or more embodiments as described herein are applicable to a multi-antenna array 106 with any number of a plurality of antennas.

As depicted in FIG. 2A, the power measured from the six different power sensors of transceiver 200A are provided to correlation module 214. Correlation module 214 may implement the one or more embodiments as described herein. Specifically, and as will be described in further detail below with relation to the flow diagram of FIGS. 3A and 3B, correlation module 214 may use the power measurements obtained by the six different power sensors to estimate an auto-correlation matrix for the transceiver 200A with multi-antenna array 106A. For example, the correlation module 214 may utilize the power measurement from each of power sensors 202A-202C with the plurality (e.g., three) of different combined power measurements from power sensors 203A-203C to estimate an auto-correlation matrix for transceiver 200A with multi-antenna array 106A.

Figure 2B:
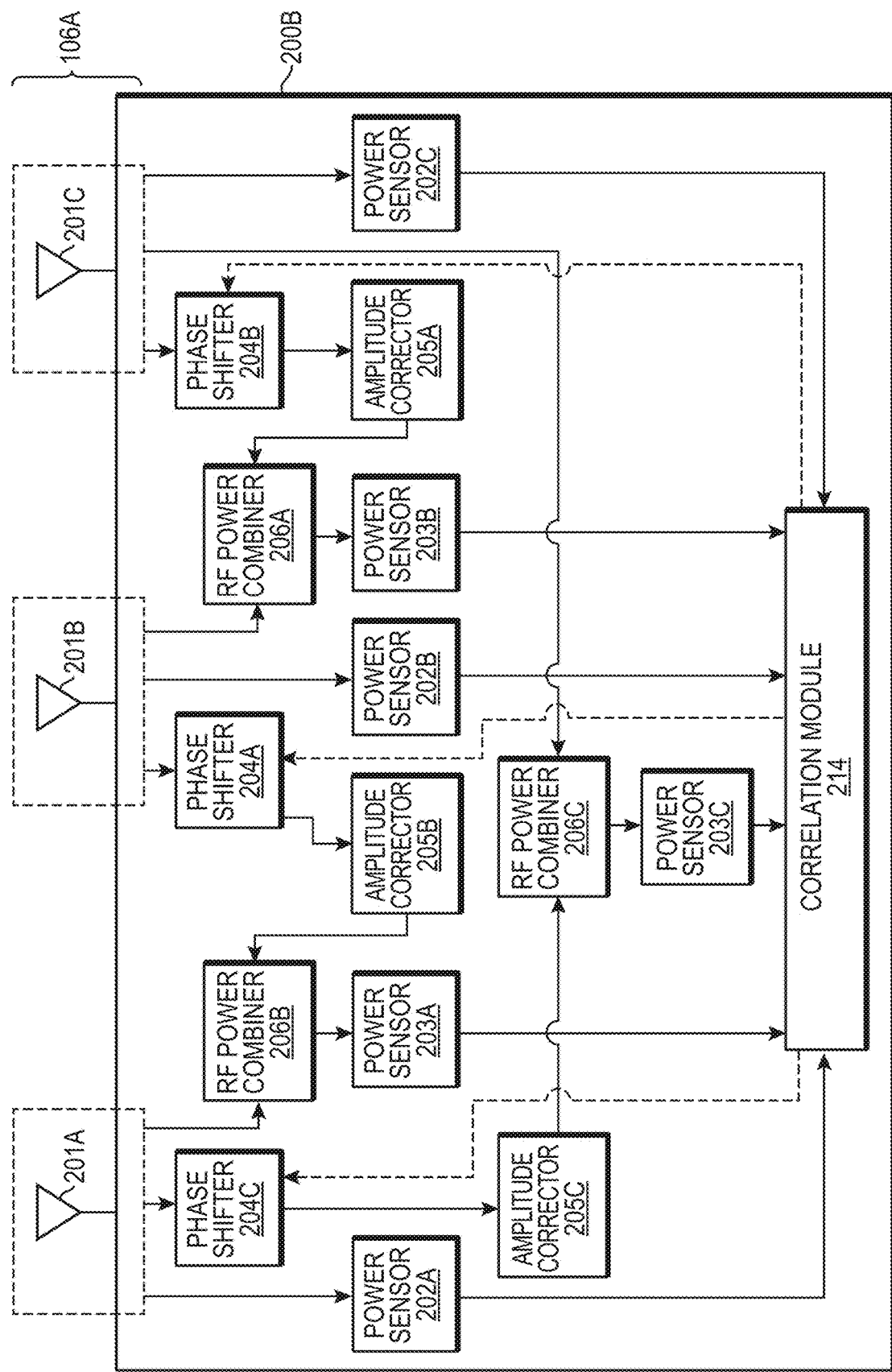
FIG. 2B is a different example transceiver with a multi-antenna array having three antennas, amplitude correctors, and RF power combiners for estimating an auto-correlation matrix according to the one or more embodiments as described herein.

FIG. 2B is a different example transceiver 200B with a multi-antenna array 106A having three antennas, amplitude correctors, and RF power combiners for estimating an auto-correlation matrix according to the one or more embodiments as described herein.

FIG. 2B is similar to FIG. 2A in that the transceiver 200B of FIG. 2B includes a different power sensor for each individual antenna and a different power sensor for each unique pair of antennas. However, the transceiver 200B also includes an amplitude corrector and a power combiner for each phase shifter. As explained above, each phase shifter (e.g., 204A-204C) can shift the signals that are received at a corresponding antenna in phase and in amplitude. To correct the amplitude, the shifted signal that is output from the phase shifter may be provided to an amplitude corrector that may correct the amplitude of the shifted signal to generate a corrected shifted signal. The corrected shifted signal may then be provided to an RF power combiner with a signal from the other antenna of the unique pair of antennas to generate a combined signal. The combined signal may then be provided to a power sensor to measure a power of the combined signal.

For example, and for unique pair of antennas 201A and 201B, the shifted signal from phase shifter 204A (corresponding to the signals received at antenna 201B) may be provided to amplitude corrector 205B. The amplitude corrector 205B may correct the amplitude of the shifted signal and generate a corrected shifted signal. The corrected shifted signal may be provided to the RF power combiner 206B that may combine the corrected shifted signal with the signal from antenna 201A to generate a combined signal. The combined signal may then be provided to power sensor 203A to measure the power of the combined signal and the measured combined power may be provided to the correlation module 214. The amplitude corrector 205A and RF power combiner 206A may operate in a similar manner for the unique pair of antennas 201B and 201C. Further, the amplitude corrector 205C and RF power combiner 206C may operate in a similar manner for the unique pair of antennas 201A and 201C.

As depicted in FIG. 2B, the power measured from the six different power sensors of transceiver 200B are provided to correlation module 214 that can estimate an auto-correlation matrix for the transceiver 200B with multi-antenna array 106A.

Figure 2C:
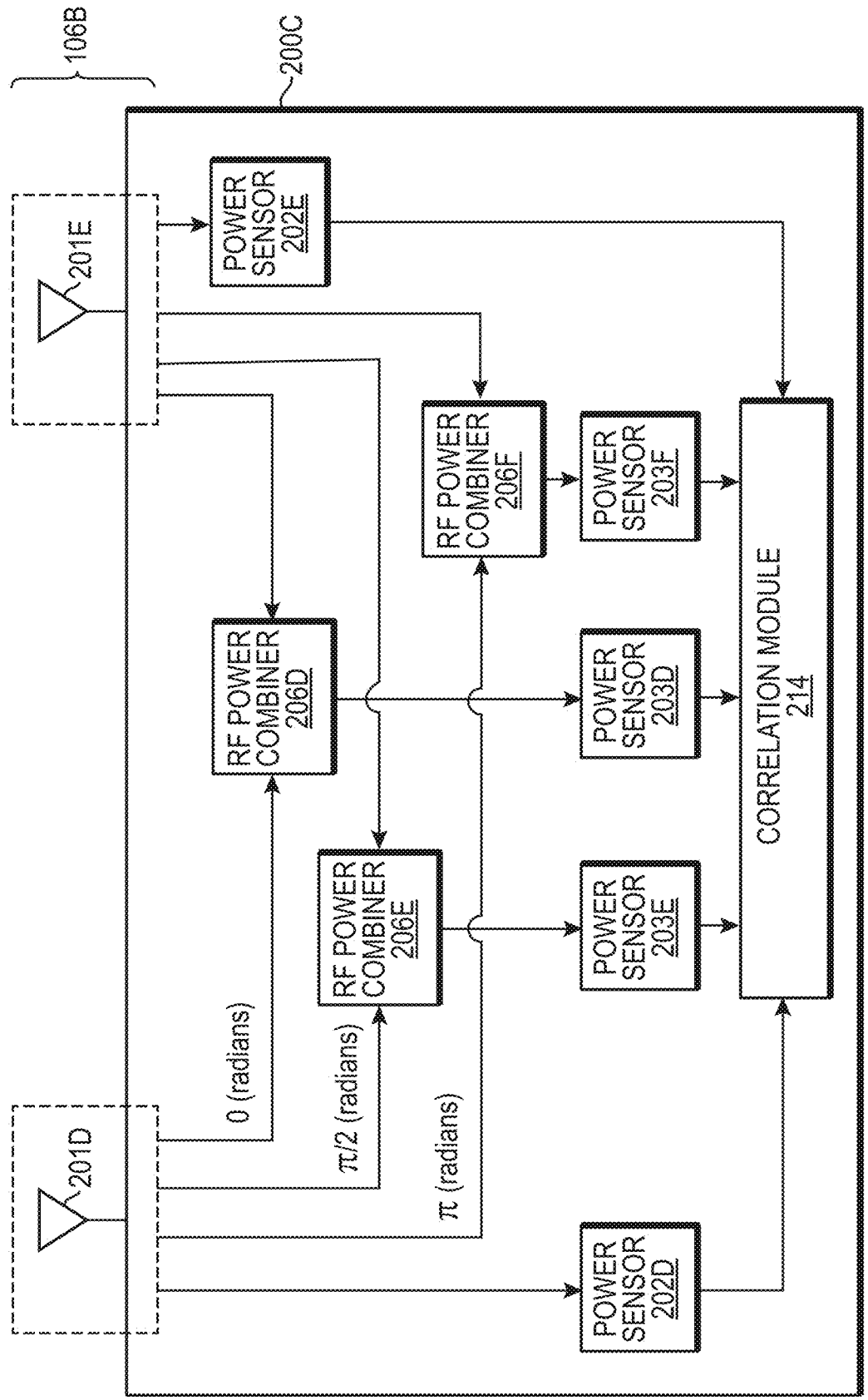
FIG. 2C is an even more different example transceiver, for estimating an auto-correlation matrix, including a multi-antenna array with two antennas and without phase shifters of FIGS. 2A and 2B and without amplitude correctors of FIG. 2B according to the one or more embodiments as described herein.

FIG. 2C is an even different example transceiver, for estimating an auto-correlation matrix, including a multi-antenna array with two antennas and without phase shifters of FIGS. 2A and 2B and without amplitude correctors of FIG. 2B according to the one or more embodiments as described herein. The transceiver 200C of FIG. 2C includes multi-antenna array 106B with two antennas 201D and 201E for simplicity and ease of understanding. However, it is expressly contemplated that the configuration of the transceiver 200C of FIG. 2C is applicable to a transceiver with a multi-antenna array that includes any other number of a plurality of antennas.

As depicted in FIG. 2C, power sensor 202D measures the power of the RF signals received at antenna 201D. Power sensor 202E measures the power of the RF signals received at antenna 201E. The measured powers can then be provided to correlation module 214.

As further depicted in FIG. 2C, the RF signals from one antenna of each unique pair of antennas is programmatically (e.g., simultaneously available in hardware) offset in phase (without a phase shifter), based on a phase setting of 0, π/2, and π (radians). Specifically, and as depicted in FIG. 2C for the unique pair of antennas 201D and 201E, the RF signals received at antenna 201D are offset in phase by 0, π/2, and π (radians) to generate three different shifted signals.

Each of the three different shifted signals may be provided to a different RF power combiner to combine the corresponding shifted signal with the signals received at antenna 201E. Specifically, RF power combiner 206D combines the shifted signals, corresponding to the signals received at antenna 201D with a phase offset of 0, with the RF signals received at antenna 201E to generate combined signals. RF power combiner 206E combines the shifted signals, corresponding to the signals received at antenna 201D with a phase offset of π/2, with the RF signals received at antenna 201E to generate combined signals. RF power combiner 206F combines the shifted signals, corresponding to the signals received at antenna 201D with a phase offset of w, with the RF signals received at antenna 201E to generate combined signals.

Each of the three combined signals may be provided to a different power sensor to generate three different combined power measurements for unique pair of antennas 201D and 201E. Specifically, power sensor 203D measures a power of the combined signal that is received from RF power combiner 206D and that is based on a phase offset of 0. Power sensor 203E measures a power of the combined signal that is received from RF power combiner 206E and that is based on a phase offset of π/2. Power sensor 203F measures a power of the combined signal that is received from RF power combiner 206F and that is based on a phase offset of if. The three different combined power measurements are then provided from power sensors 203D-203F to correlation module 214.

As will be described in further detail below, the correlation module 214 can estimate the auto-correlation matrix for transceiver 200C using the three combined power measurements and the power measurements for each antenna of multi-antenna array 106B. Therefore, and based on the configuration of transceiver 200C, a total of five power sensors and five power measurements are needed for the correlation module 214 to estimate the auto-correlation matrix for the transceiver 200C of FIG. 2C. As such, a transceiver according to the one or more embodiments as described herein that does not include a phase shifter may require a total of 3n+1 power sensors to estimate the auto-correlation matrix.

Figure 3A:
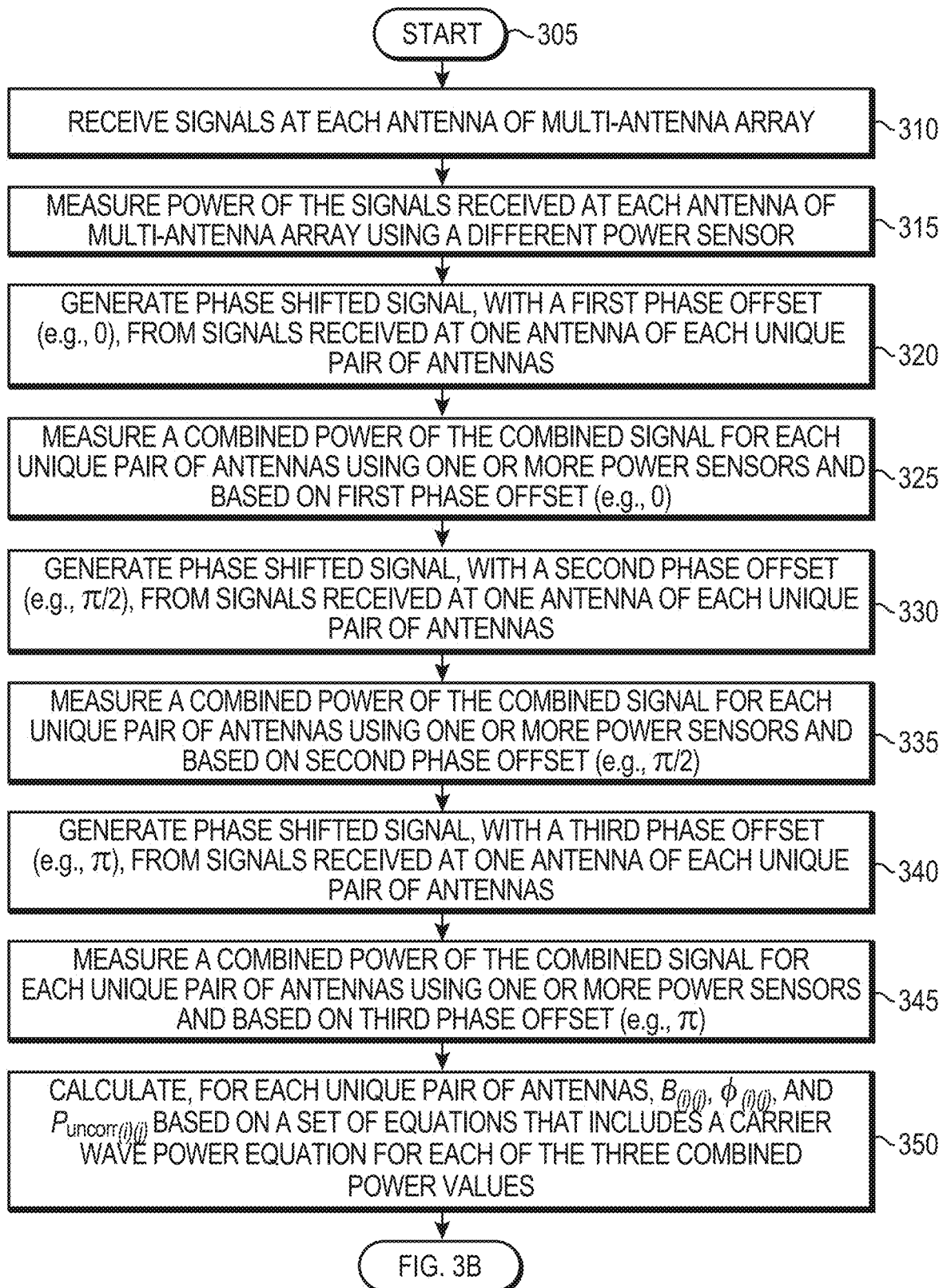
FIGS. 3A and 3B together constitute a flow diagram of a sequence of steps for estimating an auto-correlation matrix for a multi-antenna array using power measurements from a plurality of sensors according to the one or more embodiments as described herein.
Figure 3B:
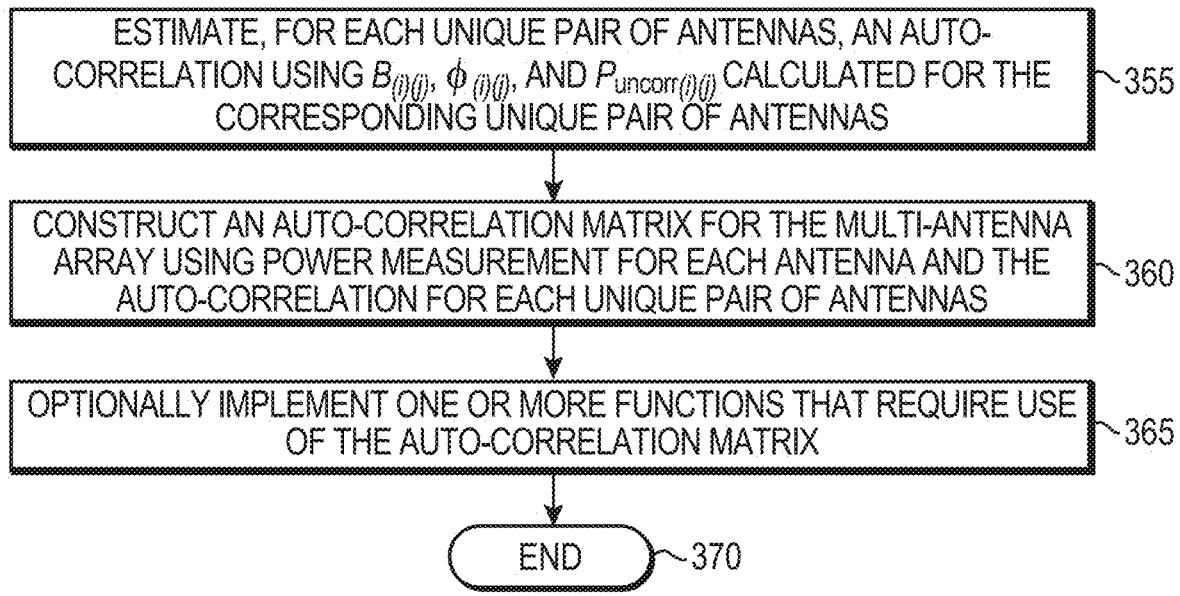

FIGS. 3A and 3B together constitute a flow diagram of a sequence of steps for estimating an auto-correlation matrix for a multi-antenna array using power measurements from a plurality of sensors according to the one or more embodiments as described herein. As illustrative examples, the flow diagram of FIGS. 3A and 3B may refer to the transceivers 200A and 200B and the multi-antenna array 106A of FIGS. 2A and 2B. However, it is expressly contemplated that the references to FIGS. 2A and 2B are for illustrative purposes only, and the flow diagram of FIGS. 3A and 3B are applicable to any antenna array system that requires the use of an auto-correlation matrix (e.g., transceiver 200C of FIG. 2C).

The description of FIGS. 3A and 3B include general formulas, for any unique pair of antennas, with a corresponding formula number. However, the formulas included in the description of FIGS. 3A and 3B that are related to the specific examples of FIGS. 2A and 2B do not include formula numbers.

The procedure starts at step 305 of FIG. 3A and continues to step 310. At step 310, each antenna of the multi-antenna array 106 receives signals. For example, and as depicted in FIGS. 2A and 2B, each of antennas 201A, 201B, and 201C may receive signals. In an embodiment, the signals may be RF signals received from transmitters/receivers 108. In an embodiment, the signals may be navigation signals in the RF domain that are received from one or more transmitters/receivers 108.

The procedure continues from step 310 to step 315. At step 315, a different power sensor (i.e., antenna assigned power sensor) measures the power of the signals received at a different antenna of the multi-antenna array 106.

For the example as depicted in FIGS. 2A and 2B, transceivers 200A and 200B include a separate and dedicated power sensor for each of antennas 201A, 201B, and 201C. Specifically, power sensor 202A measures the power of the signals received at antenna 201A. Further, power sensor 202B measures the power of the signals received at antenna 201B, while power sensor 202C measures the power of the signals received at antenna 201C.

For the examples of FIGS. 2A and 2B, let it be assumed that the power measured for each of antennas 201A, 201B, and 201C are as follows:
Power of signals received at antenna 201A=1;
Power of signals received at antenna 201B=2.0798; and
Power of signals received at antenna 201C=0.9806.

In an embodiment, the unit of measurement for each of the measured power values may be watts or milliwatts. The powers measured at power sensors 202A-202C may be provided to correlation module 214 as depicted in FIGS. 2A and 2B.

The procedure continues from step 315 to step 320. At step 320, a phase shifted signal, with a first phase offset, is generated from the signals received at one antenna of each unique pair of antennas. In an embodiment, the first phase offset is 0 (radians). In an embodiment, the generated phase shifted signal is shifted in phase and in amplitude based on the first offset, e.g., phase offset of 0. The use of "first" phase offset here, and the use of "second" phase offset and "third" phase offset later in the description are not meant to indicate a temporal relationship. Instead, first, second, and third are used herein to differentiate between the different phase offsets.

For the examples of FIGS. 2A and 2B, transceivers 200A and 200B include phase shifter 204A for the unique pair of antennas 201A and 201B. Phase shifter 204A may, based on a phase setting of 0, shift the signals that are received at antenna 201B in phase and in amplitude to generate shifted signals. Similarly, transceivers 200A and 200B may include phase shifter 204B for the unique pair of antennas 201B and 201C. Phase shifter 204B may, based on a phase setting of 0, shift the signals that are received at antenna 201C in phase and in amplitude to generate shifted signals. Transceivers 200A and 200B may also include phase shifter 204C for the unique pair of antennas 201A and 201C. Phase shifter 204C may, based on a phase setting of 0, shift the signals that are received at antenna 201A in phase and in amplitude to generate shifted signals.

Therefore, a different phase shifter (e.g., 204A, 204B, and 204C) is utilized for each unique pair of antennas to shift the signals received at one antenna of the unique pair based on a first phase setting, e.g., a phase setting of 0.

In an embodiment and for the example of FIG. 2C, the phase shifted signal with a phase offset of 0 may be generated programmatically for antenna 201D of unique pair of antennas 201D and 201E.

The procedure continues from step 320 to step 325. At step 325, each of one or more power sensors, for each unique pair of antennas, measures the combined power of the combined signal that is based on the first phase offset, e.g., 0.

For the example of FIG. 2A, transceiver 200A includes power sensor 203A, for unique pair of antennas 201A and 201B, that receives the signals from antenna 201A and receives the shifted signals from phase shifter 204A that may have a phase setting of 0 and that is coupled to antenna 201B. Power sensor 203A may measure the combined power of the received signals. Power sensor 203B of FIG. 2A may operate similarly for the unique pair of antennas 201B and 201C based on a phase setting of 0 for phase shifter 204B. Power sensor 203C of FIG. 2A may also operate similarly for the unique pair of antennas 201A and 201C based on a phase setting of 0 for phase shifter 204C.

In an embodiment, and as depicted in FIG. 2B, amplitude correctors and RF combiners may be utilized prior to a power sensor measuring the combined power for a unique pair of antennas. For example, as depicted in FIG. 2B, the shifted signal that is generated by phase shifter 204A for the unique pair of antennas 201A and 201B may be provided to amplitude corrector 205B. Amplitude corrector 205B may correct the amplitude of the shifted signal to generate a corrected shifted signal. The corrected shifted signal may then be provided to RF power combiner 206B that may combine the corrected shifted signal with the signal received at antenna 201A to generate a combined signal. The combined signal may then be provided to power sensor 203A that may measure a power of the combined signal for the unique pair of antennas 201A and 201B. Amplitude corrector 205A and RF power combiner 206A may operate similarly for unique pair of antennas 201B and 201C. Further, amplitude corrector 205C and RF power combiner 206C may operate similarly for unique pair of antennas 201A and 201C.

In an embodiment, and as depicted in FIG. 2C, RF power combiner 206D may be utilized, without an amplitude corrector, for unique pair of antennas 201D and 201E. Specifically, RF power combiner 206D may combine the programmatically shifted signals (based on a phase offset of 0) and the signals received at antenna 201E to generate combined signals. Power sensor 203D may measure the power of the combined signals based on a phase offset of 0.

The procedure continues from step 325 to step 330. At step 330, a phase shifted signal, with a second phase offset, is generated from the signals received at one antenna of the unique pair of antennas. In an embodiment, the second phase offset is π/2 (radians). In an embodiment, the generated phase shifted signal is shifted in phase and in amplitude based on the second offset, e.g., phase offset of π/2.

For the examples of FIGS. 2A and 2B, transceivers 200A and 200B include phase shifter 204A for the unique pair of antennas 201A and 201B. Phase shifter 204A may, based on a phase setting of π/2, shift the signals that are received at antenna 201B in phase and in amplitude to generate shifted signals. Phase shifter 204B may operate similarly for unique pair of antennas 201B and 201C using a phase setting of π/2. Further, phase shifter 204C may operate similarly for unique pair of antennas 201A and 201C using a phase setting of π/2.

In an embodiment and for the example of FIG. 2C, the phase shifted signal with a phase offset of π/2 may be generated programmatically for antenna 201D of unique pair of antennas 201D and 201E.

The procedure continues from step 330 to step 335. At step 335, each of one or more power sensors, for each unique pair of antennas, measures the combined power of the combined signal that is based on the second phase offset, e.g., π/2.

For the example of FIG. 2A, transceiver 200A includes power sensor 203A, for unique pair of antennas 201A and 201B, that receives the signal from antenna 201A and receives the shifted signal from phase shifter 204A that may have a phase setting of π/2 and that is coupled to antenna 201B. Power sensor 203A may measure the combined power of the received signals. Power sensor 203B may operate similarly for the unique pair of antennas 201B and 201C based on the phase setting of π/2 for phase shifter 204B, and power sensor 203C may operate similarly for the unique pair of antennas 201A and 201C based on the phase setting of π/2 for phase shifter 204C.

In an embodiment, and as depicted in FIG. 2B, amplitude correctors and RF combiners may be utilized prior to a power sensor measuring the combined power for a unique pair of antennas in a similar manner as described above with relation to step 325.

In an embodiment, and as depicted in FIG. 2C, RF combiner 206E may be utilized, without an amplitude corrector, for unique pair of antennas 201D and 201E. Specifically, RF combiner 206E may combine the programmatically shifted signals (based on a phase offset of π/2) with the RF signals received at antenna 201E to generate combined signals. The combined signals may be provided to power sensor 203E to measure a power of the combined signals based on the phase offset of π/2.

The procedure continues from step 335 to step 340. At step 340, a phase shifted signal, with a third phase offset, is generated from the signals received at one antenna of each unique pair of antennas. In an embodiment, the third phase offset is w (radians). In an embodiment, the generated phase shifted signal is shifted in phase and in amplitude based on the third offset, e.g., phase offset of π.

For the examples of FIGS. 2A and 2B, transceivers 200A and 200B include phase shifter 204A for the unique pair of antennas 201A and 201B. Phase shifter 204A may, based on a phase setting of w, shift the signals that are received at antenna 201B in phase and in amplitude to generate shifted signals. Phase shifter 204B may operate similarly for unique pair of antennas 201B and 201C using a phase setting of π.

Further, phase shifter 204C may operate similarly for unique pair of antennas 201A and 201C using a phase setting of π.

In an embodiment and for the example of FIG. 2C, the phase shifted signal with a phase offset of if may be generated programmatically for antenna 201D of unique pair of antennas 201D and 201E.

The procedure continues from step 340 to step 345. At step 345, each of one or more power sensors, for each unique pair of antennas, measures the combined power of the combined signal that is based on the third phase offset, e.g., π.

For the example of FIG. 2A, transceiver 200A includes power sensor 203A, for unique pair of antennas 201A and 201B, that receives the signal from antenna 201A and receives the shifted signal from phase shifter 204A that may have a phase setting of π and that is coupled to antenna 201B. Power sensor 203A may measure the combined power of the received signals. Power sensor 203B may operate similarly for the unique pair of antennas 201B and 201C based on the phase setting of π for phase shifter 204B, and power sensor 203C may operate similarly for the unique pair of antennas 201A and 201C based on the phase setting of π for phase shifter 204C.

In an embodiment, and as depicted in FIG. 2B, amplitude correctors and RF combiners may be utilized prior to a power sensor measuring the combined power for a unique pair of antennas in a similar manner as described above with relation to step 325.

In an embodiment, and as depicted in FIG. 2C, RF combiner 206F may be utilized, without an amplitude corrector, for unique pair of antennas 201D and 201E. Specifically, RF combiner 206F may combine the programmatically shifted signals (based on a phase offset of π) with the RF signals received at antenna 201E to generate combined signals. The combined signals may be provided to power sensor 203F to measure a power of the combined signals based on the phase offset of π.

According to the examples as described in relation to FIGS. 2A and 2B, a total of six power sensors are utilized for the antenna array system that includes three antennas. Specifically, a different and dedicated power sensor is used for each antenna to measure a power of the signals received at that antenna. Therefore, and as described in relation to step 315, each of the three power sensors (e.g., 202A, 202B, and 202C) makes a power measurement such that three power measurements are obtained. Moreover, and as described in relation to steps 320 through 345, three different combined power measurements are made for each unique pair of antennas based on three different phase settings, e.g., 0, π/2, and π (radians). As a result, a total of nine combined power measurements are made for the antenna array system of FIGS. 2A and 2B that includes three antennas.

According to the example as described in relation to FIG. 2C, a total of five power sensors are utilized for the antenna array system that includes two antennas. Specifically, a different and dedicated power sensor is used for each antenna to measure a power of the signals received at that antenna. For example, and as described in relation to step 315 for FIG. 2C, a power measurement is made by power sensor 202D for the signals received at antenna 201D and a power measurement is made by power sensor 202E for the signals received at antenna 201E. Moreover, and as described in relation to steps 320 through 345, each of power sensors 203D, 203E, and 203F make a combined power measurement for unique pair of antennas 201D and 201E based on programmatically set phase settings of 0, π/2, and if. As a result, a total of three combined power measurements are made for the antenna array system of FIG. 2C that includes two antennas.

As will be described in further detail below, the three different combined power measurements for each unique pair of antennas can be used to calculate power correlations for the antennas of the corresponding unique pair. The calculated power correlation for each unique pair of antennas can then be used with the power measurements, for each individual antenna made at step 315, to construct the power correlation matrix as will be described in further detail below.

Referring back to FIG. 3A, the procedure continues from step 345 to step 350. Although steps 350 through 365 may refer to the example multi-antenna array 106A of FIGS. 2A and 2B that includes antennas 201A, 201B, and 201C, it is expressly contemplated that steps 350 through 365 are applicable to multi-antenna array 106B of FIG. 2C that includes antennas 201D and 201E and any other types of multi-antenna arrays. As such, the reference to multi-antenna array 106A of FIGS. 2A and 2B in relation to steps 350 through 365 is for illustrative purposes only.

At step 350, the correlation module 214 calculates $B_{(i)(j)}$, $\phi_{(i)(j)}$, and $P_{uncorr(i)(j)}$ for each unique pair of antennas of the multi-antenna array 106 using a set of equations that includes a carrier wave power equation for each of the three combined power values. Specifically, the correlation module 214 calculates $B_{(i)(j)}$, $\phi_{(i)(j)}$, and $P_{uncorr(i)(j)}$ for each unique pair of antennas by solving a system of power equations, wherein each power equation of the system corresponds to a different combined power measurement that is based on one of the selected phase offsets (e.g., 0, $\pi/2$, and $\pi$) as will be described in further detail below.

To illustratively describe how the one or more embodiments determine the system of equations to be solved, it is necessary to describe the relationship between antennas of a unique pair and the signals received at those antennas.

To that end, the relative correlated carrier signal entering each of two antennas (e.g., antenna i and antenna j) of a unique pair of antennas in the time domain may be represented as follows:

$$V_i(t) = \cos(\omega t) \qquad (1)$$

$$V_j(t) = B * \cos(\omega t + \phi + \theta) \qquad (2)$$

where
- i represents an antenna (e.g., first antenna) of the unique pair of antennas;
- j represents the other antenna (e.g., second antenna) of the unique pair of antennas;
- $V_i$ is the voltage at the first antenna of a unique pair of antennas;
- $\omega$ is the angular frequency;
- t is time;
- $V_j$ is the voltage at the second antenna, i.e., other antenna, of the unique pair of antennas;
- B is a relative amplitude offset between the two paths to the antennas. This relative phase offset is typically due to phase differences between the two antennas;
- $\phi$ is a relative phase offset between the two paths. This relative phase offset is typically due to the phase differences between the two antennas; and
- $\theta$ is an adjustable phase value based on a phase offset corresponding to an antenna of the unique pair of antennas (e.g., the phase shift set for phase shifter 204C coupled to antenna 201A of unique pair of antennas 201A and 201C in FIGS. 2A and 2B).

For the illustrative example of FIGS. 2A and 2B, the relative correlated carrier signal entering each of the two antennas of unique pair of antennas 201A and 201B in the time domain may be represented as follows:

$$V_{201A}(t) = \cos(\omega t)$$

$$V_{201B}(t) = B * \cos(\omega t + \phi + \theta)$$

The relative correlation carrier signal may be similarly represented for the other unique pair of antennas (e.g., 201B/201C and 201A/201C) of multi-antenna array 106A.

The power, which corresponds to the two antennas of the unique pair, is proportional to the root-mean-square of the voltage signals as defined in formulas 1 and 2. Therefore, the power of the carrier wave signal travelling between two identical paths corresponding to the two antennas of the unique pair for the adjusted phase value (0) can be written as:

$$P_{(i)(j)}(\theta) \propto \sqrt{(V_i(t) + V_j(t))^2} + P_{uncorr(i)(j)} \qquad (3)$$

Wherein
- $P_{(i)(j)}(\theta)$ is the power (i.e., combined power) of the carrier wave signal travelling between two identical paths corresponding to the two antennas of the unique pair for the adjusted phase value; and
- $P_{uncorr(i)(j)}$ is the uncorrelated power between the two paths. The uncorrelated power between the two paths is typically due to multiple signal source envelopes entering the two antennas of the unique pair.

Using trigonometry, the three above formulas can be combined and rewritten as:

$$P_{(i)(j)}(\theta) \propto 0.5 B_{(i)(j)}^2 + B_{(i)(j)} \cos(\phi_{(i)(j)} + \theta) + 0.5 + P_{uncorr(i)(j)} \qquad (4)$$

As can be seen above, formula 4 includes three unknowns of $B_{(i)(j)}$, $\phi_{(i)(j)}$, and $P_{uncorr(i)(j)}$. However, formula 4 is a non-linear equation. As such, any three power measurements, e.g., any three power measurements at three different phase settings, cannot always be used to solve for the three unknowns of formula 4. However, and according to the one or more embodiments as described herein, the power ($P_{(i)(j)}$) can be measured at three phase offsets ($\theta$) of 0, $\pi/2$, and $\pi$ to solve formula 4 for $B_{(i)(j)}$, $\phi_{(i)(j)}$, and $P_{uncorr(i)(j)}$. For example, and as explained above in relation to steps 325 through 345, phase shifters (e.g., 204A-204C) and power sensors (e.g., 203A-203C) are utilized to measure the combined power of each unique pair of antennas based on the particular phase offsets ($\theta$) of 0, $\pi/2$, and w. The combined power, for each unique pair of antennas, at the three selected offsets, can be written as:

$$P_{(i)(j)}(0) = 0.5 B_{(i)(j)}^2 + B_{(i)(j)} \cos(\phi_{(i)(j)}) + 0.5 + P_{uncorr(i)(j)} \qquad (5)$$

$$P_{(i)(j)}(\pi) = 0.5 B_{(i)(j)}^2 - B_{(i)(j)} \cos(\phi_{(i)(j)}) + 0.5 + P_{uncorr(i)(j)} \qquad (6)$$

-continued $$P_{(i)(j)}(\pi/2) = 0.5B_{(i)(j)}^2 - B_{(i)(j)}\sin(\phi_{(i)(j)}) + 0.5 + P_{uncorr(i)(j)} \quad (7)$$

Formulas 5, 6, and 7, can be re-arranged into an analytical solution to solve for the three unknowns ($P_{uncorr(i)(j)}$, $B_{(i)(j)}$, and $\phi_{(i)(j)}$) as:

$$P_{uncorr(i)(j)} = \frac{P_{(i)(j)}(0) - P_{(i)(j)}(\pi) - B_{(i)(j)}^2 - 1}{2} \quad (8)$$

$$B_{(i)(j)} = \frac{P_{(i)(j)}(0) - P_{(i)(j)}(\pi)}{2\cos(\phi_{(i)(j)})} \quad (9)$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right) \quad (10)$$

For the illustrative example of FIGS. 2A and 2B, the analytical solution for solving the three unknowns for unique pair of antennas 201A and 20B may be:

$$P_{uncorr(201A)(201B)} = \frac{P_{(201A)(201B)}(0) - P_{(201A)(201B)}(\pi) - B_{(201A)(201B)}^2 - 1}{2}$$

$$B_{(201A)(201B)} = \frac{P_{(201A)(201B)}(0) - P_{(201A)(201B)}(\pi)}{2\cos(\phi_{(201A)(201B)})}$$

$$\phi_{(201A)(201B)} = \tan^{-1}\left(2\frac{P_{(201A)(201B)}(0) - P_{(201A)(201B)}(\pi/2)}{P_{(201A)(201B)}(0) - P_{(201A)(201B)}(\pi)} - 1\right)$$

According to the one or more embodiments as described herein, the correlation module 214 can solve the system of equations that includes formulas 8, 9, and 10 to calculate $B_{(i)(j)}$, $\phi_{(i)(j)}$, and $P_{uncorr(i)(j)}$ for each unique pair of antennas of the multi-antenna array 106. For the examples of FIGS. 2A and 2B, the correlation module 214 calculates $B_{(201A)(201B)}$, $\phi_{(201A)(201B)}$, and $P_{uncorr(201A)(201B)}$ for the unique pair of antennas 204A and 204B using the formulas above that include the three combined power values that are measured at steps 325, 335, and 345 for the three selected angles of 0, $\pi/2$, and w (e.g., $P_{(201A)(201B)}(0)$, $P_{(201A)(201B)}(\pi/2)$, and $P_{(201A)(201B)}(\pi)$). Similarly, the correlation module 214 similarly calculates $B_{(201B)(201C)}$, $\phi_{(201B)(201C)}$, and $P_{uncorr(201B)(201C)}$ for the unique pair of antennas 204B and 204C. Further, the correlation module 214 similarly calculates $B_{(201A)(201C)}$, $\phi_{(201A)(201C)}$, and $P_{uncorr(201A)(201C)}$ for the unique pair of antennas 204A and 204C.

The procedure continues from step 350 of FIG. 3A to step 355 of FIG. 3B. At step 355, the correlation module 214 estimates an auto-correlation for each unique pair of antennas using $B_{(i)(j)}$, $\phi_{(i)(j)}$, and $P_{uncorr(i)(j)}$ that are calculated for the corresponding unique pair of antennas in step 350.

According to the one or more embodiments as described herein, it may be assumed that the co-variance is proportional to the power of the two signals combined (i.e., received) into a power sensor for the unique pair of antennas. Based on this assumption, the one or more embodiments as described herein may use the following equation to estimate the auto-correlation ($E[X_iX_j]$) between antennas of a unique pair of antennas of the multi-antenna array:

$$E[X_iX_j] \propto (P_{(i)(j)}(\theta_{Max(i)(j)}) - P_{(i)(j)}(\theta_{Min(i)(j)}))e^{i\theta_{Max(i)(j)}} \quad (11)$$

Where
$P_{(i)(j)}(\theta_{Max(i)(j)})$ is the maximum power of the combined signals for the unique pair of antennas at a particular angle $\theta_{Max(i)(j)}$;
$P_{(i)(j)}(\theta_{Min(i)(j)})$ is the minimum power of the combined signals for the unique pair of antennas at a particular angle $\theta_{Min(i)(j)}$;

As explained above, the power for a unique pair of antennas can be represented by formula 4. As a result, $P_{(i)(j)}(\theta_{Max(i)(j)})$ and $P_{(i)(j)}(\theta_{Min(i)(j)})$ of formula 11 may be solved based on formula 4. Specifically, $P_{(i)(j)}(\theta_{Max(i)(j)})$ and $P_{(i)(j)}(\theta_{Min(i)(j)})$ may be calculated for each unique pair of antennas, based on formula 4, as follows:

$$P_{(i)(j)}(\theta_{Max(i)(j)}) \propto 0.5B_{(i)(j)}^2 + B_{(i)(j)}\cos(\phi_{(i)(j)} + \theta_{Max(i)(j)}) + 0.5 + P_{uncorr(i)(j)} \quad (12)$$

$$P_{(i)(j)}(\theta_{Min(i)(j)}) \propto 0.5B_{(i)(j)}^2 + B_{(i)(j)}\cos(\phi_{(i)(j)} + \theta_{Min(i)(j)}) + 0.5 + P_{uncorr(i)(j)} \quad (13)$$

As explained above, $B_{(i)(j)}$, $\phi_{(i)(j)}$, and $P_{uncorr(i)(j)}$ of formulas 12 and 13 are calculated at step 350 for each unique pair of antennas using formulas 8, 9, and 10. Therefore, only $\theta_{Max(i)(j)}$ is undetermined in formula 12 for each unique pair of antennas to calculate $P_{(i)(j)}(\theta_{Max(i)(j)})$ for each unique pair of antennas. Similarly, only $\theta_{Min(i)(j)}$ is undetermined in formula 13 for each unique pair of antennas to calculate $P_{(i)(j)}(\theta_{Min(i)(j)})$ for each unique pair of antennas.

As shown, $\theta_{Max(i)(j)}$ and $\phi_{(i)(j)}$ are arguments for the cosine function of formula 12. All cosine functions are sinusoidal and range between −1 to 1. Therefore, the cosine function of formula 12 will have its largest value when $\cos(\phi_{(i)(j)} + \theta_{Max(i)(j)}) = 1$. Because $\cos(0)=1$, the correlation module 214 can determine that $P_{(i)(j)}(\theta_{Max(i)(j)})$ occurs when $(i)(j) + \theta_{Max(i)(j)} = 0$, which means that $\cos(\phi_{(i)(j)} + \theta_{Max(i)(j)})$ of formula 12 will be a value of 1. Therefore, the correlation module 214 determines that $\theta_{Max(i)(j)}$ of formula 12 must be $-\phi_{(i)(j)}$ so that $\phi_{(i)(j)} + \theta_{Max(i)(j)}$ is equal to 0 in formula 12. This in turn results in $\cos(\phi_{(i)(j)} + \theta_{Max(i)(j)})$ equaling 1 in formula 12. As explained above, $\phi_{(i)(j)}$ is calculated for each unique pair of antennas at step 350. As such, the correlation module 214 determines that, for a unique pair of antennas, $\theta_{Max(i)(j)}$ in formula 12 must be $-\phi_{(i)(j)}$. This then allows the correlation module 214 to calculate $P_{(i)(j)}(\theta_{Max(i)(j)})$ for the unique pair of antennas using formula 12.

Because the cosine function is periodic, the correlation module 214 determines that $\theta_{Min(i)(j)} = \theta_{Max(i)(j)} \pm \pi$. As such, the correlation module 214 can determine $\theta_{Min(i)(j)}$ and then calculate $P_{(i)(j)}(\theta_{Min(i)(j)})$ for the unique pair of antennas using formula 13.

Therefore, and according to the one or more embodiments as described herein, the correlation module 214 determines $\theta_{Max(i)(j)}$ and $\theta_{Min(i)(j)}$ as described above and based on $\phi_{(i)(j)}$ that is calculated in step 350. That is, the correlation module 214 can determine $\theta_{Max(i)(j)}$ and $\theta_{Min(i)(j)}$ for formulas 12 and 13 based on determining $\phi_{(i)(j)}$ in step 350 and leveraging the characteristics of the cosine function as it relates to formulas 12 and 13.

Accordingly, the correlation module 214 can utilize $B_{(i)(j)}$, $\theta_{(i)(j)}$, $P_{uncorr(i)(j)}$, and $\theta_{Max(i)(j)}$ with formula 12 to calculate $P_{(i)(j)}(\theta_{Max(i)(j)})$ for each unique pair of antennas. Similarly, the correlation module 214 can utilize $B_{(i)(j)}$, $\phi_{(i)(j)}$, $P_{uncorr(i)(j)}$, and $\theta_{Min(i)(j)}$ with formula 13 to calculate $P_{(i)(j)}(\theta_{Min(i)(j)})$ for each unique pair of antennas.

In the illustrative example for antennas 201A and 201B of FIGS. 2A and 2B, the correlation module 214 can calculate $P_{(201A)(201B)}(\theta_{Max(201A)(201B)})$ and $P_{(201A)(201B)}(\theta_{Min(201A)(201B)})$ as follows:

$$P_{(201A)(201B)}(\theta_{Max(201A)(201B)}) \propto 0.5 B^2_{(201A)(201B)} + B_{(201A)(201B)}$$
$$\cos(\phi_{(201A)(201B)} + \theta_{Max(201A)(201B)}) + 0.5 + P_{uncorr(201A)(201B)}$$

$$P_{(201A)(201B)}(\theta_{Min(201A)(201B)}) \propto 0.5 B^2_{(201A)(201B)} + B_{(201A)(201B)}$$
$$\cos(\phi_{(201A)(201B)} + \theta_{Min(201A)(201B)}) + 0.5 + P_{uncorr(201A)(201B)},$$

using the values of $B_{(201A)(201B)}$, $\phi_{(201A)(201B)}$, $P_{uncorr(201A)(201B)}$, $\theta_{Max(201A)(201B)}$, and $\theta_{Min(201A)(201B)}$ that are determined for the unique pair of antennas 201A and 201B as described above. The correlation module 214 can similarly calculate $P_{(201B)(201C)}(\theta_{Max(201B)(201C)})$ and $P_{(201B)(201C)}(\theta_{Min(201B)(201C)})$ for unique pair of antennas 201B and 201C of multi-antenna array 106A. The correlation module 214 can similarly calculate $P_{(201A)(201C)}(\theta_{Max(201A)(201C)})$ and $P_{(201A)(201C)}(\theta_{Min(201A)(201C)})$ for unique pair of antennas 201A and 201C of multi-antenna array 106A.

Alternatively, the correlation module 214 may use a search technique, which herein may be referred to as a maximum and/or minimum search technique, to identify $P_{(i)(j)}(\theta_{Max(i)(j)})$ and $P_{(i)(j)}(\theta_{Min(i)(j)})$ for each unique pair of antennas. For example, consider antennas 201A and 201B of multi-antenna array 106A of FIG. 2A. Power sensor 203A may make a plurality of combined power measurements based on phase shifter 204A having a plurality of different phase offsets at a predetermined/selected phase interval. The correlation module 214 may compare all the combined power measurements to identify an extreme value (e.g., largest power value) and adding ±π radians to recover the phase of the other extreme value (e.g., smallest power value) due to the properties of sinusoids. The identified maximum and minimum are then $P_{(201A)(201B)}(\theta_{Max(201A)(201B)})$ and $P_{(201A)(201B)}(\theta_{Min(201A)(201B)})$, respectively. In addition or alternatively, the correlation module 214 may identify both the phase of the largest power value and the phase of the smallest power value using the maximum and minimum search technique as described herein. After adding ±π radians, the correlation module 214 may average the extreme values (e.g., the identified maximum and minimum values as described herein) to improve the estimate of the maximum and/or minimum. The correlation module 214 may perform a similar maximum and/or minimum search technique to identify $P_{(201B)(201C)}(\theta_{Max(201B)(201C)})$ and $P_{(201B)(201C)}(\theta_{Min(201B)(200C)})$ for unique pair of antennas 201B and 201C and $P_{(201A)(201C)}(\theta_{Max(201A)(201C)})$ and $P_{(201A)(201C)}(\theta_{Min(201A)(201C)})$ for unique pair of antennas 201A and 201C. For this alternative search approach, FIG. 3 may include additional steps after step 345 and before step 350 to generate additional shifted signals, based on additional phase offsets at the selected phase interval, and to perform corresponding combined power measurements.

Now that $P_{(i)(j)}(\theta_{Max(i)(j)})$ and $P_{(i)(j)}(\theta_{Min(i)(j)})$ are calculated for each unique pair of antennas, the correlation module 214 may estimate the auto-correlation for each unique pair of antennas (e.g., $E[X_iX_j]$) using equation 11.

Therefore, and in this example, the correlation module 214 may determine the auto-correlation for the unique pair of antennas 201A and 201B, e.g., $E[X_{201A}X_{201B}]$, using formula 11 with the values for $P_{(201A)(201B)}(\theta_{Max(201A)(210B)})$ and $P_{(201A)(201B)}(\theta_{Min(201A)(201B)})$ that are determined as described above for the unique pair of antennas 201A and 201B. Similarly, the correlation module 214 may determine the auto-correlation for the unique pair of antennas 201B and 201C, e.g., $[X_{201B}X_{201C}]$, using formula 11 with the values for $P_{(201B)(201C)}(\theta_{Max(201B)(201C)})$ and $P_{(201B)(201C)}(\theta_{Min(201B)(201C)})$ that are determined as described above for the unique pair of antennas 201B and 201C. The correlation module 214 may also determine the auto-correlation for the unique pair of antennas 201A and 201C, e.g., $[X_{201A}X_{201C}]$, using formula 11 with the values for $P_{(201A)(201C)}(\theta_{Max(201A)(201C)})$ and $P_{(201A)(201C)}(\theta_{Min(201A)(201C)})$ that are determined as described above for the unique pair of antennas 201A and 201C.

In an embodiment, the auto-correlation for each unique pair of antennas may be complex and include a real component (amplitude) and an imaginary component (phase). As an illustrative example, let it be assumed that the correlation module 214 determines that the unique pair of antennas for the multi-antenna array 106A of FIGS. 2A and 2B have the following auto-correlation values:

$$E[X_{201A}X_{201B}] = -0.7846 + 0.9350i$$
$$E[X_{201B}X_{201C}] = 1.0331 - 0.0971i$$
$$E[X_{201A}X_{201C}] = -0.3735 + 0.5910i$$

The procedure continues from step 355 to step 360 of FIG. 3B. At step 360, the correlation module 214 constructs an auto-correlation matrix for the multi-antenna array 106 using the power measurement for each antenna and the auto-correlation for each unique pair of antennas.

In an embodiment, the auto-correlation matrix is a square N×N matrix where N is the number of the plurality of antennas of the multi-antenna array 106. In the examples of FIGS. 2A and 2B, multi-antenna array 106A includes three antennas. Therefore, the auto-correlation matrix for the multi-antenna array 106A of FIGS. 2A and 2B is a 3×3 matrix.

In an embodiment, the auto-correlation matrix ($\hat{R}_{xx}$) for the multi-antenna array 106A of FIGS. 2A and 2B may be represented as:

$$\hat{R}_{XX} = \begin{bmatrix} R_{11} & R_{12} & R_{13} \\ R_{21} & R_{22} & R_{23} \\ R_{31} & R_{32} & R_{33} \end{bmatrix} = \qquad (14)$$

$$\begin{bmatrix} E[X_{201A}X_{201A}] & E[X_{201A}X_{201B}] & E[X_{201A}X_{201C}] \\ E[X_{201B}X_{201A}] & E[X_{201B}X_{201B}] & E[X_{201B}X_{201C}] \\ E[X_{201C}X_{201A}] & E[X_{201C}X_{201B}] & E[X_{201C}X_{201C}] \end{bmatrix}.$$

$R_{11}$ represents the auto-correlation of the first antenna (e.g., antenna 201A) with itself, $R_{12}$ represents the auto-correlation of the first antenna (e.g., antenna 201A) and the second antenna (e.g., antenna 201B), $R_{13}$ represents the auto-correlation of the first antenna (e.g., antenna 201A) and the third antenna (e.g., antenna 201C), and so forth.

As indicated above in formula 14, the correlation module 214 can construct a portion (e.g., top right triangle) of the auto-correlation matrix using the auto-correlation values (e.g., $E[X_{201A}X_{201B}]$, $E[X_{201B}X_{201C}]$, and $E[X_{201A}X_{201C}]$) that are calculated, e.g., estimated, for each unique pair of antennas as described above in relation to step 355.

Replacing the placeholders of the top right triangle with the corresponding auto-correlation values calculated in step 355 generates the following incomplete auto-correlation matrix for multi-antenna array 106A:

$$\begin{bmatrix} E[X_{201A}X_{201A}] & -0.7846+0.9350i & -0.3735+0.5910i \\ E[X_{201B}X_{201A}] & E[X_{201B}X_{201B}] & 1.0331-0.0971i \\ E[X_{201C}X_{201A}] & E[X_{201C}X_{201B}] & E[X_{201C}X_{201C}] \end{bmatrix}$$

The diagonal components of the auto-correlation matrix represent the correlation of the antenna with itself. As such, there is no complex component and the power measurements made for each antenna of the multi-antenna array 160 at step 315 can be used for the diagonal components. For example, the correlation module 214 may use the power measured for the signals received at antenna 201A for $E[X_{201A}X_{201A}]$ of the auto-correlation matrix. The correlation module 214 may use the power measured for the signals received at antenna 201B for $E[X_{201B}X_{201B}]$ of the auto-correlation matrix. The correlation module 214 may use the power measured for the signals received at antenna 201C for $E[X_{201C}X_{201C}]$ of the auto-correlation matrix.

Replacing the placeholders of the diagonal components with the example power values provided above in relation to step 315 generates the following incomplete auto-correlation matrix.

$$\begin{bmatrix} 1 & -0.7846+0.9350i & -0.3735+0.5910i \\ E[X_{201B}X_{201A}] & 2.0798 & 1.0331-0.0971i \\ E[X_{201C}X_{201A}] & E[X_{201C}X_{201B}] & 0.9806 \end{bmatrix}$$

According to the one or more embodiments as described herein, the auto-correlation matrix is Hermitian, meaning that $R_{(i)(j)} = R_{(i)(j)}^*$. Therefore, because the upper right triangle portion is determined as described above and based on the auto-correlation values calculated in relation to step 355, the correlation module 214 can determine the remaining lower left triangle of the auto-correlation matrix.

As such, the placeholders of the lower left triangle of the auto-correlation matrix may be replaced with corresponding values that are determined based on the auto-correlation values calculated in step 355 and the fact that the auto-correlation matrix is Hermitian. Accordingly, the correlation module 214 may construct the following auto-correlation matrix for multi-antenna array 106A:

$$\begin{bmatrix} 1 & -0.7846+0.9350i & -0.3735+0.5910i \\ -0.7846-0.9350i & 2.0798 & 1.0331-0.0971i \\ -0.3735-0.5910i & 1.0331+0.0971i & 0.9806 \end{bmatrix}$$

Therefore, the correlation module 214 can construct the auto-correlation matrix for antenna 106A based on the power measurements obtained in the RF domain from the six power sensors (e.g., 202A, 202B, 202C, 203A, 203B, and 203C). The example of the correlation module 214 constructing the auto-correlation matrix by first determining the upper right triangle, then the diagonal components, and lastly the lower left triangle is for ease of understanding and illustrative purposes only. It is expressly contemplated that the correlation module 214 may construct the auto-correlation matrix by determining the components of the matrix in any order or even in parallel.

The procedure then optionally continues from step 360 to step 365. At optional step 365, transceiver 200 may implement a function that requires the use of the auto-correlation matrix constructed in step 360. Such functions may include, but are not limited to, beamform steering, interference steering, identifying locations of signal sources, MUSIC, ESPRIT, TDOA, etc. The procedure then ends at step 370.

Figure 4:
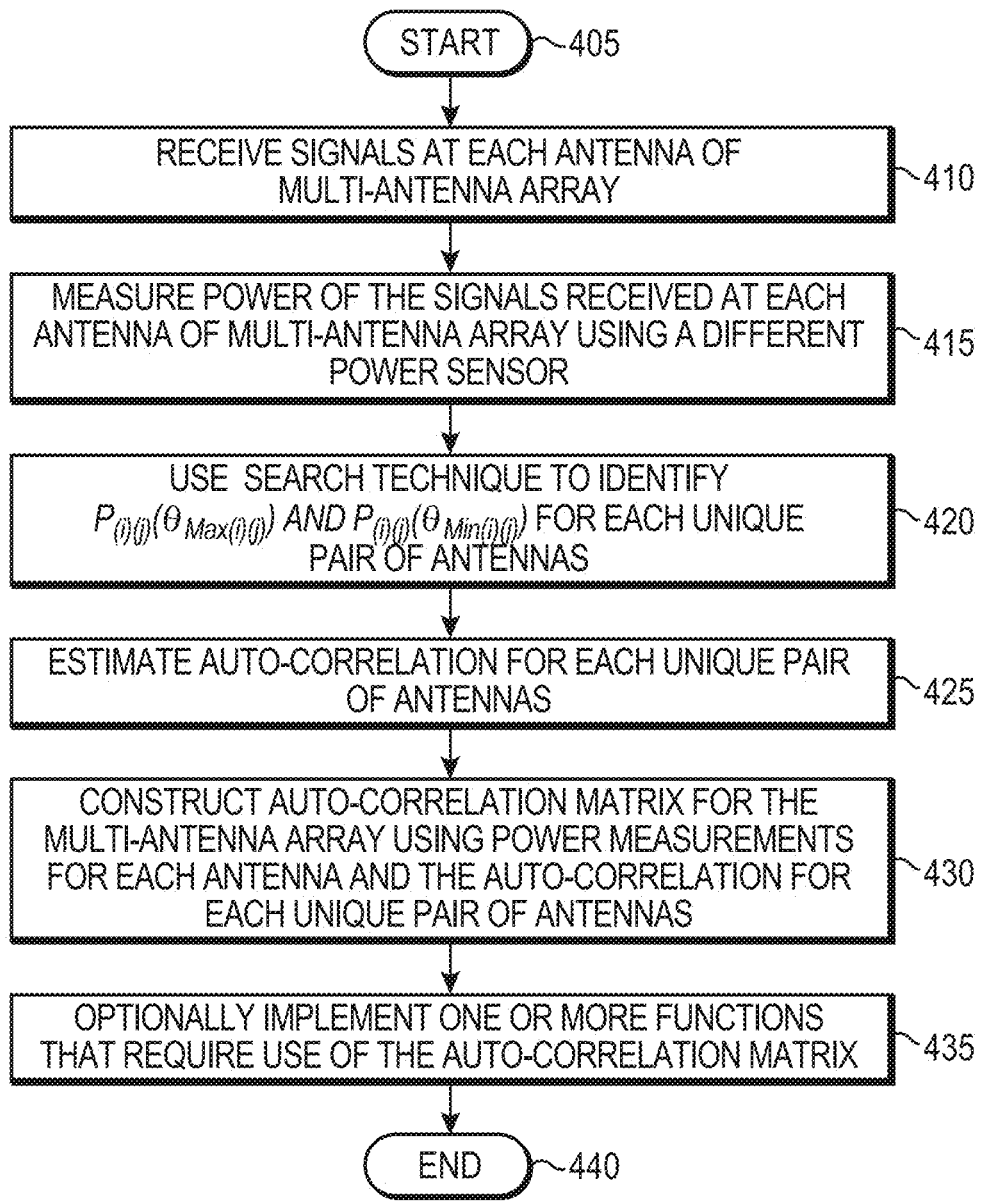
FIG. 4 is a flow diagram of a sequence of steps for estimating an auto-correlation matrix for a multi-antenna array using a search technique according to the one or more embodiments as described herein.

FIG. 4 is a flow diagram of a sequence of steps for estimating an auto-correlation matrix for a multi-antenna array using a search technique according to the one or more embodiments as described herein. The procedure of FIG. 4 starts at step 405 and continues to step 410. At step 410, each antenna of the multi-antenna array 106 receives signals. Each antenna may receive signals in a similar manner as described above in relation to step 310 of FIG. 3A.

The procedure continues to step 415. At step 415, a different power sensor (i.e., antenna assigned power sensor) measures the power of the signals received at each antenna of the multi-antenna array 106. A different power sensor may measure the power of the signals in a similar manner as described above in relation to step 315 of FIG. 3A.

The procedure continues to step 420. At step 420, the correlation module 214 uses a search technique (e.g., maximum and/or minimum search technique) to identify $P_{(i)(j)}(\theta_{Max(i)(j)})$ and $P_{(i)(j)}(\theta_{min(i)(j)})$ for each unique pair of antennas. The correlation module 214 may implement the search technique in the manner described above.

The procedure continues to step 425. At step 425, the correlation module 214 estimates an auto-correlation for each unique pair of antennas. The correlation module 214 may estimate the auto-correlation for each unique pair of antennas in a similar manner as described above in relation to step 355 of FIG. 3B.

The procedure continues to step 430. At step 430, the correlation module 214 constructs an auto-correlation matrix for the multi-antenna array 106 using the power measurement for each antenna and the auto-correlation for each unique pair of antennas. The correlation module 214 may construct the auto-correlation matrix in a similar manner as described above in relation to step 360 of FIG. 3B.

The procedure optionally continues to step 435. At optional step 435, transceiver 200 may implement a function that requires the use of the auto-correlation matrix constructed in step 430. Such functions may include, but are not limited to, beamform steering, interference steering, identifying locations of signal sources, MUSIC, ESPRIT, TDOA, etc. The procedure then ends at step 440.

It should be understood that a wide variety of adaptations and modifications may be made to the techniques. For example, the steps of the flow diagram as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the terms user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

The subject-matter according to the description above may also be considered to comprise the following aspects 1 to 20:

Aspect 1. A system for estimating an auto-correlation matrix for a transceiver with a multi-antenna array, the system comprising:
- the multi-antenna array having a plurality of antennas with at least a first antenna and a second antenna that are a unique pair of antennas, wherein each antenna of the plurality of antennas is configured to receive radio frequency (RF) signals;
- the transceiver coupled to the multi-antenna array, the transceiver comprising:
  - a processor;
  - a first antenna assigned power sensor coupled to the first antenna and configured to measure a first power value of the RF signals received at the first antenna;
  - a second antenna assigned power sensor coupled to the second antenna and configured to measure a second power value of the RF signals received at the second antenna;
  - one or more combined power sensors configured to:
    - measure, for the unique pair of antennas, a plurality of combined power values based on (1) a plurality of shifted signals, which are generated by shifting the RF signals received at the first antenna using a plurality of different phase offsets, and (2) the RF signals received at the second antenna;
  - a module executed by the processor, the module configured to:
    - estimate an auto-correlation for the first antenna and the second antenna using the plurality of different combined power values, and
- construct the auto-correlation matrix using the auto-correlation for first antenna and the second antenna, the first power value measured for the first antenna, and the second power value measured for the second antenna.

Aspect 2. The system of aspect 1, wherein the processor is configured to implement a transceiver function that uses the auto-correlation matrix.

Aspect 3. The system of one or more previous aspects, wherein the plurality of different phase offsets are selected at a predetermined interval.

Aspect 4. The system of one or more previous aspects, wherein the plurality of different phase offsets includes a first phase offset of 0 radians, a second phase offset of $\pi/2$ radians, and a third phase offset of $\pi$ radians.

Aspect 5. The system of one or more previous aspects, wherein
- a first combined power value, of the plurality of combined power values, is based on the first phase offset of 0 radians,
- a second combined power value, of the plurality of combined power values, is based on the second phase offset of $\pi/2$ radians, and
- a third combined power value, of the plurality of combined power values, is based on the third phase offset of $\pi$ radians.

Aspect 6. The system of one or more previous aspects, wherein the module is further configured to, for the unique pair of antennas, calculate:

$$P_{uncorr(i)(j)} = \frac{P_{(i)(j)}(0) - P_{(i)(j)}(\pi) - B_{(i)(j)}^2 - 1}{2}$$

$$B_{(i)(j)} = \frac{P_{(i)(j)}(0) - P_{(i)(j)}(\pi)}{2\cos(\phi_{(i)(j)})}$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right),$$

wherein
- i represents the first antenna of the unique pair of antennas,
- j represents the second antenna of the unique pair of antennas,
- $B_{(i)(j)}$ is a relative amplitude offset between two paths to the first antenna and the second antenna of the unique pair of antennas,
- $P_{uncorr(i)(j)}$ is an uncorrelated power between the two paths,
- $\phi_{(i)(j)}$ is a relative phase offset between the two paths,
- $P_{(i)(j)}$(offset) is a power of a carrier wave signal travelling between the two paths based on a particular phase offset and antenna spacing.

Aspect 7. The system of one or more previous aspects, wherein the module is further configured to, for the unique pair of antennas, calculate:

$$P_{(i)(j)}(\theta_{Max(i)(j)}) \propto 0.5B_{(i)(j)}^2 + B_{(i)(j)}\cos(\phi_{(i)(j)} + \theta_{Max(i)(j)}) + 0.5 + P_{uncorr(i)(j)}$$

$$P_{(i)(j)}(\theta_{Min(i)(j)}) \propto 0.5B_{(i)(j)}^2 + B_{(i)(j)}\cos(\phi_{(i)(j)} + \theta_{Min(i)(j)}) + 0.5 + P_{uncorr(i)(j)},$$

wherein $P_{(i)(j)}(\theta_{Max(i)(j)})$ is a maximum power of the carrier wave signal travelling between the two paths and $P_{(i)(j)}(\theta_{Min(i)(j)})$ is a minimum power of the carrier wave signal travelling between the two paths.

Aspect 8. The system of one or more previous aspects, wherein the module is further configured to, for the unique pair of antennas, calculate:

$$E[X_i X_j] \propto (P_{(i)(j)}(\theta_{Max(i)(j)}) - P_{(i)(j)}(\theta_{Min(i)(j)}))e^{i\theta_{Max(i)(j)}}$$

wherein $E[X_i X_j]$ is the auto-correlation of the unique pair of antennas.

Aspect 9. The system of one or more previous aspects, wherein the transceiver further comprises:
- an amplitude corrector configured to modify amplitudes of three selected shifted signals to generate a first corrected signal, a second corrected signal, and a third corrected signal;
- an RF power combiner coupled to the amplitude corrector, the RF power combiner configured to (1) combine the first corrected signal with the RF signals received at the second antenna to generate a first combined signal, (2) combine the second corrected signal with the RF signals received at the second antenna to generate a second combined signal, and (3) combine the third corrected signal with the RF signals received at the second antenna to generate a third combined signal; and a selected combined power sensor configured to (1) measure a first combined power value based on the first combined signal, (2) measure a second combined power value based on the second combined signal, and (3) measure a third combined power value based on the third combined signal, wherein the plurality of combined power values include the first combined power value, the second combined power value, and the third combined power value.

Aspect 10. A method for estimating an auto-correlation matrix, the method comprising:

receiving radio frequency (RF) signals at each antenna of a multi-antenna array that includes at least a first antenna and a second antenna that are a unique pair of antennas;

measuring, by a first antenna power sensor, a first power of the RF signals received at the first antenna;

measuring, by a second antenna power sensor, a second power of the RF signals received at the second antenna;

measuring, by one or more combined power sensors and for the unique pair of antennas, a plurality of combined power values based on (1) a plurality of shifted signals, which are generated by shifting the RF signals received at the first antenna using a plurality of different phase offsets, and (2) the RF signals received at the second antenna;

estimating an auto-correlation for the unique pair of antennas using the plurality of combined power values; and constructing the auto-correlation matrix using the auto-correlation for the unique pair of antennas, the first power value, and the second power value.

Aspect 11. The method of aspect 10, further comprising implementing a transceiver function that uses the auto-correlation matrix.

Aspect 12. The method of one or more of aspects 10 to 11, wherein the plurality of different phase offsets includes a first phase offset of 0 radians, a second phase offset of $\pi/2$ radians, and a third phase offset of $\pi$ radians.

Aspect 13. The method of one or more of aspects 10 to 12, wherein a first combined power value, of the plurality of combined power values, is based on the first phase offset of 0 radians, a second combined power value, of the plurality of combined power values, is based on the second phase offset of $\pi/2$ radians, and a third combined power value, of the plurality of combined power values, is based on the third phase offset of $\pi$ radians.

Aspect 14. The method of one or more of aspects 10 to 13, further comprising:

performing, for the unique pair of antennas, calculations that include:

$$P_{uncorr(i)(j)} = \frac{P_{(i)(j)}(0) - P_{(i)(j)}(\pi) - B_{(i)(j)}^2 - 1}{2}$$

$$B_{(i)(j)} = \frac{P_{(i)(j)}(0) - P_{(i)(j)}(\pi)}{2\cos(\phi_{(i)(j)})}$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right)$$

wherein i represents the first antenna of the unique pair of antennas, j represents the second antenna of the unique pair of antennas, $B_{(i)(j)}$ is a relative amplitude offset between two paths to the first antenna and the second antenna of the unique pair of antennas, $P_{uncorr(i)(j)}$ is an uncorrelated power between the two paths, $\phi_{(i)(j)}$ is a relative phase offset between the two paths, $P_{(i)(j)}$(offset) is a power of a carrier wave signal travelling between the two paths based on a particular phase offset and antenna spacing.

Aspect 15. The method of one or more of aspects 10 to 14, further comprising:

performing, for the unique pair of antennas, calculations that include:

$$P_{(i)(j)}(\theta_{Max(i)(j)}) \propto 0.5 B_{(i)(j)}^2 + B_{(i)(j)}\cos(\phi_{(i)(j)} + \theta_{Max(i)(j)}) + 0.5 + P_{uncorr(i)(j)}$$

$$P_{(i)(j)}(\theta_{Min(i)(j)}) \propto 0.5 B_{(i)(j)}^2 + B_{(i)(j)}\cos(\phi_{(i)(j)} + \theta_{Min(i)(j)}) + 0.5 + P_{uncorr(i)(j)},$$

wherein $P_{(i)(j)}(\theta_{Max(i)(j)})$ is a maximum power of the carrier wave signal travelling between the two paths and $P_{(i)(j)}(\theta_{Min(i)(j)})$ is a minimum power of the carrier wave signal travelling between the two paths.

Aspect 16. The method of one or more of aspects 10 to 15, further comprising:

performing, for the unique pair of antennas, a calculation that includes:

$$E[X_i X_j] \propto (P_{(i)(j)}(\theta_{Max(i)(j)}) - P_{(i)(j)}(\theta_{Min(i)(j)}))e^{i\theta_{Max(i)(j)}}$$

wherein $E[X_i X_j]$ is the auto-correlation of the unique pair of antennas.

Aspect 17. The method of one or more of aspects 10 to 16, further comprising:

modifying, by an amplitude corrector, amplitudes of three selected shifted signals to generate a first corrected signal, a second corrected signal, and a third corrected signal;

combining, by an RF power combiner coupled to the amplitude corrector, (1) the first corrected signal with the RF signals received at the second antenna to generate a first combined signal, (2), the second corrected signal with the RF signals received at the second antenna to generate a second combined signal, and (3) the third corrected signal with the RF signals received at the second antenna to generate a third combined signal; and measuring, by a selected combined power sensor, (1) a first combined power based on the first combined signal, (2) a second combined power based on the second combined signal, and (3) a third combined power based on the third combined signal, wherein the plurality of combined power values include the first combined power value, the second combined power value, and the third combined power value.

Aspect 18. A system for estimating an auto-correlation matrix for a multi-antenna array system, the system comprising:
- a multi-antenna array including a first antenna and a second antenna configured to receive radio frequency (RF) signals;
- a transceiver coupled to the multi-antenna array, the transceiver comprising:
  - a processor;
  - a first power sensor coupled to the first antenna and configured to measure a first power of the RF signals received at the first antenna;
  - a second power sensor coupled to the second antenna and configured to measure a second power of the RF signals received at the second antenna;
  - a phase shifter coupled to the first antenna, the phase shifter configured to: (1) shift the RF signals received at the first antenna based on a phase offset of 0 to generate a first shifted signal, (2) shift the RF signals received at the first antenna based on a phase offset of $\pi/2$ to generate a second shifted signal, and (3) shift the RF signals received at the first antenna based on a phase offset of $\pi$ to generate a third shifted signal;
  - a third power sensor configured to measure (1) a first combined power based on the first shifted signal and the RF signals received at the second antenna, (2) a second combined power based on the second shifted signal and the RF signals received at the second antenna, and (3) a third combined power based on the third shifted signal and the RF signals received at the second antenna;
  - a module executed by the processor, the module configured to estimate the auto-correlation matrix using the first power, the second power, the first combined power, the second combined power, and the third combined power.

Aspect 19. The system of aspect 18, wherein the processor is configured to implement a transceiver function using the estimated auto-correlation matrix.

Aspect 20. The system of one or more of aspects 18 to 19, wherein the module is further configured to, for a unique pair of antennas that includes the first antenna and the second antenna, calculate:

$$P_{uncorr(i)(j)} = \frac{P_{(i)(j)}(0) - P_{(i)(j)}(\pi) - B_{(i)(j)}^2 - 1}{2}$$

$$B_{(i)(j)} = \frac{P_{(i)(j)}(0) - P_{(i)(j)}(\pi)}{2\cos(\phi_{(i)(j)})}$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right),$$

wherein
- i represents the first antenna of the unique pair of antennas,
- j represents the second antenna of the unique pair of antennas,
- $B_{(i)(j)}$ is a relative amplitude offset between two paths to the first antenna and the second antenna of the unique pair of antennas,
- $P_{uncorr(i)(j)}$ is an uncorrelated power between the two paths,
- $\phi_{(i)(j)}$ is a relative phase offset between the two paths, and
- $P_{(i)(j)}$(offset) is a power of a carrier wave signal travelling between the two paths based on a particular phase offset and antenna spacing.

What is claimed is:

1. A system for estimating an auto-correlation matrix for a transceiver with a multi-antenna array, the system comprising:
   - the multi-antenna array having a plurality of antennas with at least a first antenna and a second antenna that are a unique pair of antennas, wherein each antenna of the plurality of antennas is configured to receive radio frequency (RF) signals; and
   - the transceiver coupled to the multi-antenna array, the transceiver comprising:
     - a processor;
     - a first antenna assigned power sensor coupled to the first antenna and configured to measure a first power value of the RF signals received at the first antenna;
     - a second antenna assigned power sensor coupled to the second antenna and configured to measure a second power value of the RF signals received at the second antenna;
     - one or more combined power sensors configured to:
       - measure, for the unique pair of antennas, a plurality of combined power values based on (1) a plurality of shifted signals, which are generated by shifting the RF signals received at the first antenna using a plurality of different phase offsets, and (2) the RF signals received at the second antenna; and
     - a module executed by the processor, the module when executed by the processor configured to:
       - estimate an auto-correlation for the first antenna and the second antenna using the plurality of different combined power values, and
       - construct the auto-correlation matrix using the auto-correlation for the first antenna and the second antenna, the first power value measured for the first antenna, and the second power value measured for the second antenna.

2. The system of claim 1, wherein the processor is configured to implement a transceiver function that uses the auto-correlation matrix.

3. The system of claim 1, wherein the plurality of different phase offsets are selected at a predetermined interval.

4. The system of claim 1, wherein the plurality of different phase offsets includes a first phase offset of 0 radians, a second phase offset of $\pi/2$ radians, and a third phase offset of $\pi$ radians.

5. The system of claim 4, wherein
   - a first combined power value, of the plurality of combined power values, is based on the first phase offset of 0 radians,
   - a second combined power value, of the plurality of combined power values, is based on the second phase offset of $\pi/2$ radians, and
   - a third combined power value, of the plurality of combined power values, is based on the third phase offset of $\pi$ radians.

6. The system of claim 5, the module when executed by the processor is further configured to, for the unique pair of antennas, calculate:

$$P_{uncorr(i)(j)} = \frac{P_{(i)(j)}(0) - P_{(i)(j)}(\pi) - B_{(i)(j)}^2 - 1}{2}$$

-continued $$B_{(i)(j)} = \frac{P_{(i)(j)}(0) - P_{(i)(j)}(\pi)}{2\cos(\phi_{(i)(j)})}$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right),$$

wherein
- i represents the first antenna of the unique pair of antennas,
- j represents the second antenna of the unique pair of antennas,
- $B_{(i)(j)}$ is a relative amplitude offset between two paths to the first antenna and the second antenna of the unique pair of antennas,
- $P_{uncorr(i)(j)}$ is an uncorrelated power between the two paths,
- $\phi_{(i)(j)}$ is a relative phase offset between the two paths,
- $P_{(i)(j)}$(offset) is a power of a carrier wave signal travelling between the two paths based on a particular phase offset and antenna spacing.

7. The system of claim 6, wherein the module when executed by the processor is further configured to, for the unique pair of antennas, calculate:

$$P_{(i)(j)}(\theta_{Max(i)(j)}) \propto 0.5 B_{(i)(j)}^2 + B_{(i)(j)}\cos(\phi_{(i)(j)} + \theta_{Max(i)(j)}) + 0.5 + P_{uncorr(i)(j)}$$

$$P_{(i)(j)}(\theta_{Min(i)(j)}) \propto 0.5 B_{(i)(j)}^2 + B_{(i)(j)}\cos(\phi_{(i)(j)} + \theta_{Min(i)(j)}) + 0.5 + P_{uncorr(i)(j)},$$

wherein $P_{(i)(j)}(\theta_{Max(i)(j)})$ is a maximum power of the carrier wave signal travelling between the two paths and $P_{(i)(j)}(\theta_{Min(i)(j)})$ is a minimum power of the carrier wave signal travelling between the two paths.

8. The system of claim 7, wherein the module when executed by the processor is further configured to, for the unique pair of antennas, calculate:

$$E[X_i X_j] \propto (P_{(i)(j)}(\theta_{Max(i)(j)}) - P_{(i)(j)}(\theta_{Min(i)(j)}))e^{j\theta_{Max(i)(j)}}$$

wherein $E[X_i X_j]$ is the auto-correlation of the unique pair of antennas.

9. The system of claim 1, wherein the transceiver further comprises:
- an amplitude corrector configured to modify amplitudes of three selected shifted signals to generate a first corrected signal, a second corrected signal, and a third corrected signal;
- an RF power combiner coupled to the amplitude corrector, the RF power combiner configured to (1) combine the first corrected signal with the RF signals received at the second antenna to generate a first combined signal, (2) combine the second corrected signal with the RF signals received at the second antenna to generate a second combined signal, and (3) combine the third corrected signal with the RF signals received at the second antenna to generate a third combined signal; and
- a selected combined power sensor configured to (1) measure a first combined power value based on the first combined signal, (2) measure a second combined power value based on the second combined signal, and (3) measure a third combined power value based on the third combined signal, wherein the plurality of combined power values include the first combined power value, the second combined power value, and the third combined power value.

10. A method for estimating an auto-correlation matrix, the method comprising:
- receiving radio frequency (RF) signals at each antenna of a multi-antenna array that includes at least a first antenna and a second antenna that are a unique pair of antennas;
- measuring, by a first antenna power sensor, a first power of the RF signals received at the first antenna;
- measuring, by a second antenna power sensor, a second power of the RF signals received at the second antenna;
- measuring, by one or more combined power sensors and for the unique pair of antennas, a plurality of combined power values based on (1) a plurality of shifted signals, which are generated by shifting the RF signals received at the first antenna using a plurality of different phase offsets, and (2) the RF signals received at the second antenna;
- estimating an auto-correlation for the unique pair of antennas using the plurality of combined power values; and
- constructing the auto-correlation matrix using the auto-correlation for the unique pair of antennas, the first power value, and the second power value.

11. The method of claim 10, further comprising implementing a transceiver function that uses the auto-correlation matrix.

12. The method of claim 10, wherein the plurality of different phase offsets includes a first phase offset of 0 radians, a second phase offset of π/2 radians, and a third phase offset of π radians.

13. The method of claim 12, wherein
- a first combined power value, of the plurality of combined power values, is based on the first phase offset of 0 radians,
- a second combined power value, of the plurality of combined power values, is based on the second phase offset of π/2 radians, and
- a third combined power value, of the plurality of combined power values, is based on the third phase offset of π radians.

14. The method of claim 13, further comprising:
performing, for the unique pair of antennas, calculations that include:

$$P_{uncorr(i)(j)} = \frac{P_{(i)(j)}(0) - P_{(i)(j)}(\pi) - B_{(i)(j)}^2 - 1}{2}$$

$$B_{(i)(j)} = \frac{P_{(i)(j)}(0) - P_{(i)(j)}(\pi)}{2\cos(\phi_{(i)(j)})}$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right),$$

wherein
- i represents the first antenna of the unique pair of antennas,
- j represents the second antenna of the unique pair of antennas,
- $B_{(i)(j)}$ is a relative amplitude offset between two paths to the first antenna and the second antenna of the unique pair of antennas,
- $P_{uncorr(i)(j)}$ is an uncorrelated power between the two paths, $\phi_{(i)(j)}$ is a relative phase offset between the two paths,
$P_{(i)(j)}$(offset) is a power of a carrier wave signal travelling between the two paths based on a particular phase offset and antenna spacing.

15. The method of claim 14, further comprising:
performing, for the unique pair of antennas, calculations that include:

$$P_{(i)(j)}(\theta_{Max(i)(j)}) \propto 0.5B_{(i)(j)}^2 + B_{(i)(j)}\cos(\phi_{(i)(j)} + \theta_{Max(i)(j)}) + 0.5 + P_{uncorr(i)(j)}$$

$$P_{(i)(j)}(\theta_{Min(i)(j)}) \propto 0.5B_{(i)(j)}^2 + B_{(i)(j)}\cos(\phi_{(i)(j)} + \theta_{Min(i)(j)}) + 0.5 + P_{uncorr(i)(j)},$$

wherein $P_{(i)(j)}(\theta_{Max(i)(j)})$ is a maximum power of the carrier wave signal travelling between the two paths and $P_{(i)(j)}(\theta_{Min(i)(j)})$ is a minimum power of the carrier wave signal travelling between the two paths.

16. The method of claim 15, further comprising:
performing, for the unique pair of antennas, a calculation that includes:

$$E[X_iX_j] \propto (P_{(i)(j)}(\theta_{Max(i)(j)}) - P_{(i)(j)}(\theta_{Min(i)(j)}))e^{j\theta_{Max(i)(j)}}$$

wherein $E[X_iX_j]$ is the auto-correlation of the unique pair of antennas.

17. The method of claim 10, further comprising:
modifying, by an amplitude corrector, amplitudes of three selected shifted signals to generate a first corrected signal, a second corrected signal, and a third corrected signal;
combining, by an RF power combiner coupled to the amplitude corrector, (1) the first corrected signal with the RF signals received at the second antenna to generate a first combined signal, (2), the second corrected signal with the RF signals received at the second antenna to generate a second combined signal, and (3) the third corrected signal with the RF signals received at the second antenna to generate a third combined signal; and
measuring, by a selected combined power sensor, (1) a first combined power based on the first combined signal, (2) a second combined power based on the second combined signal, and (3) a third combined power based on the third combined signal, wherein the plurality of combined power values include the first combined power value, the second combined power value, and the third combined power value.

18. A system for estimating an auto-correlation matrix for a multi-antenna array system, the system comprising:
the multi-antenna array including a first antenna and a second antenna configured to receive radio frequency (RF) signals;
a transceiver coupled to the multi-antenna array, the transceiver comprising:
a processor;
a first power sensor coupled to the first antenna and configured to measure a first power of the RF signals received at the first antenna;
a second power sensor coupled to the second antenna and configured to measure a second power of the RF signals received at the second antenna;
a phase shifter coupled to the first antenna, the phase shifter configured to: (1) shift the RF signals received at the first antenna based on a phase offset of 0 to generate a first shifted signal, (2) shift the RF signals received at the first antenna based on a phase offset of $\pi/2$ to generate a second shifted signal, and (3) shift the RF signals received at the first antenna based on a phase offset of $\pi$ to generate a third shifted signal;
a third power sensor configured to measure (1) a first combined power based on the first shifted signal and the RF signals received at the second antenna, (2) a second combined power based on the second shifted signal and the RF signals received at the second antenna, and (3) a third combined power based on the third shifted signal and the RF signals received at the second antenna;
a module executed by the processor, the module when executed by the processor configured to estimate the auto-correlation matrix using the first power, the second power, the first combined power, the second combined power, and the third combined power.

19. The system of claim 18, wherein the processor is configured to implement a transceiver function using the estimated auto-correlation matrix.

20. The system of claim 18, wherein the module when executed by the processor is further configured to, for a unique pair of antennas that includes the first antenna and the second antenna, calculate:

$$P_{uncorr(i)(j)} = \frac{P_{(i)(j)}(0) - P_{(i)(j)}(\pi) - B_{(i)(j)}^2 - 1}{2}$$

$$B_{(i)(j)} = \frac{P_{(i)(j)}(0) - P_{(i)(j)}(\pi)}{2\cos(\phi_{(i)(j)})}$$

$$\phi_{(i)(j)} = \tan^{-1}\left(2\frac{P_{(i)(j)}(0) - P_{(i)(j)}(\pi/2)}{P_{(i)(j)}(0) - P_{(i)(j)}(\pi)} - 1\right),$$

wherein
i represents the first antenna of the unique pair of antennas,
j represents the second antenna of the unique pair of antennas,
$B_{(i)(j)}$ is a relative amplitude offset between two paths to the first antenna and the second antenna of the unique pair of antennas,
$P_{uncorr(i)(j)}$ is an uncorrelated power between the two paths,
$\phi_{(i)(j)}$ is a relative phase offset between the two paths, and
$P_{(i)(j)}$(offset) is a power of a carrier wave signal travelling between the two paths based on a particular phase offset and antenna spacing.

* * * * *